United States Patent
Podluzhny et al.

(10) Patent No.: US 11,010,090 B2
(45) Date of Patent: May 18, 2021

(54) METHOD AND DISTRIBUTED COMPUTER SYSTEM FOR PROCESSING DATA

(71) Applicant: YANDEX EUROPE AG, Lucerne (CH)

(72) Inventors: Denis Nikolaevich Podluzhny, Syktyvkar (RU); Andrey Vladimirovich Fomichev, Moscow (RU); Aleksey Alekseevich Stankevichus, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 125 days.

(21) Appl. No.: 16/574,277

(22) Filed: Sep. 18, 2019

(65) Prior Publication Data

US 2020/0210094 A1    Jul. 2, 2020

(30) Foreign Application Priority Data

Dec. 29, 2018 (RU) .................... 2018147497

(51) Int. Cl.
*G06F 3/06* (2006.01)
*G06F 11/00* (2006.01)
(Continued)

(52) U.S. Cl.
CPC ............ *G06F 3/0653* (2013.01); *G06F 3/065* (2013.01); *G06F 3/067* (2013.01); *G06F 3/0617* (2013.01);
(Continued)

(58) Field of Classification Search
CPC .... G06F 3/0653; G06F 11/008; G06F 3/0617; G06F 3/0619; G06F 3/065; G06F 3/0652; G06F 3/067; G06F 3/0689
See application file for complete search history.

(56) References Cited

U.S. PATENT DOCUMENTS 5,247,677 A    9/1993  Welland et al.
5,278,984 A    1/1994  Batchelor
(Continued)

FOREIGN PATENT DOCUMENTS

CN    105653365 A    6/2016
CN    103514037 B    6/2018
(Continued)

OTHER PUBLICATIONS

Ex Parte Quale Action dated Apr. 23, 2020 received in respect of a related U.S. Appl. No. 16/383,976.
(Continued)

*Primary Examiner* — Matthew M Kim
*Assistant Examiner* — Indranil Chowdhury
(74) *Attorney, Agent, or Firm* — BCF LLP

(57) ABSTRACT

A computer-implemented method for implementing a distributed computer system for processing data and a distributed computer system for processing the data are provided. The method includes receiving an indication of a redundancy algorithm to be used for generating redundancy-data based on the data. The method also includes receiving an indication of a failure-model algorithm to be used for confirming successful storage of the data to the client. The method also includes at a data storage moment in time instructing the set of storage devices to store the redundancy-data. The method also includes, at a data access moment time, receiving an indication of an access request for the data. The method also includes, at a data access moment time, applying the failure-model algorithm onto notifications received from the set of storage devices for non-ambiguously determining whether a confirmation of successful storage of the data has been provided to the client.

30 Claims, 8 Drawing Sheets

(51) Int. Cl.
*G06F 11/20* (2006.01)
*G06F 11/10* (2006.01)

(52) U.S. Cl.
CPC .......... *G06F 3/0619* (2013.01); *G06F 3/0652* (2013.01); *G06F 3/0689* (2013.01); *G06F 11/008* (2013.01); *G06F 11/1076* (2013.01); *G06F 11/2056* (2013.01); *G06F 11/2058* (2013.01)

(56) References Cited

U.S. PATENT DOCUMENTS

| | | |
|---|---|---|
| 5,577,202 A | 11/1996 | Padgett |
| 5,640,563 A | 6/1997 | Carmon |
| 5,845,316 A | 12/1998 | Hillyer et al. |
| 6,023,720 A | 2/2000 | Aref et al. |
| 6,256,755 B1 | 7/2001 | Hook et al. |
| 6,553,472 B2 | 4/2003 | Yang et al. |
| 6,757,897 B1 | 6/2004 | Shi et al. |
| 6,791,992 B1 | 9/2004 | Yun et al. |
| 6,851,115 B1 | 2/2005 | Cheyer et al. |
| 6,859,931 B1 | 2/2005 | Cheyer et al. |
| 7,073,021 B2 | 7/2006 | Iren et al. |
| 7,177,866 B2 | 2/2007 | Holenstein et al. |
| 7,474,989 B1 | 1/2009 | Wilcoxon |
| 7,562,362 B1 | 7/2009 | Paquette et al. |
| 7,971,093 B1 | 6/2011 | Goel et al. |
| 8,037,024 B1 | 10/2011 | Bozkaya et al. |
| 8,117,621 B2 | 2/2012 | Singh et al. |
| 8,145,838 B1 | 3/2012 | Miller et al. |
| 8,254,172 B1 | 8/2012 | Kan et al. |
| 8,595,302 B2 | 11/2013 | Krishnamurthi et al. |
| 8,799,913 B2 | 8/2014 | Yoo et al. |
| 8,826,301 B2 | 9/2014 | Kim et al. |
| 8,838,539 B1 | 9/2014 | Ashcraft et al. |
| 8,850,018 B2 | 9/2014 | Massa et al. |
| 8,850,446 B2 | 9/2014 | Avni et al. |
| 8,930,954 B2 | 1/2015 | Hildrum et al. |
| 8,966,490 B2 | 2/2015 | Avni et al. |
| 9,037,826 B1 | 5/2015 | Brooker et al. |
| 9,047,331 B2 | 6/2015 | Rao et al. |
| 9,093,160 B1 | 7/2015 | Ellis et al. |
| 9,203,900 B2 | 12/2015 | Rao et al. |
| 9,251,195 B2 | 2/2016 | Yamada |
| 9,304,694 B2 | 4/2016 | Colgrove et al. |
| 9,348,592 B2 | 5/2016 | Jha |
| 9,354,813 B1 | 5/2016 | Dolan et al. |
| 9,400,682 B2 | 7/2016 | Persikov et al. |
| 9,477,521 B2 | 10/2016 | Truong et al. |
| 9,489,443 B1 | 11/2016 | Muniswamy-Reddy et al. |
| 9,547,528 B1 | 1/2017 | McClure et al. |
| 9,569,339 B1 | 2/2017 | Villalobos et al. |
| 9,639,396 B2 | 5/2017 | Pho et al. |
| 9,699,017 B1 | 7/2017 | Gupta et al. |
| 9,811,391 B1 | 11/2017 | Barrett |
| 9,921,557 B2 | 3/2018 | Slupik et al. |
| 10,552,215 B1 | 2/2020 | Xu et al. |
| 10,572,323 B1 | 2/2020 | Zhai et al. |
| 2002/0099756 A1 | 7/2002 | Catthoor et al. |
| 2003/0115410 A1 | 6/2003 | Shriver |
| 2004/0213387 A1 | 10/2004 | Chandrasekaran |
| 2005/0047425 A1 | 3/2005 | Liu et al. |
| 2007/0002750 A1 | 1/2007 | Sang et al. |
| 2007/0226332 A1 | 9/2007 | Becker-Szendy et al. |
| 2007/0268516 A1 | 11/2007 | Bugwadia et al. |
| 2007/0282660 A1 | 12/2007 | Forth et al. |
| 2008/0049633 A1 | 2/2008 | Edwards et al. |
| 2008/0168452 A1 | 7/2008 | Molaro et al. |
| 2008/0320482 A1 | 12/2008 | Dawson et al. |
| 2009/0013154 A1 | 1/2009 | Du et al. |
| 2009/0292744 A1 | 11/2009 | Matsumura |
| 2009/0300449 A1 | 12/2009 | Qian et al. |
| 2010/0011182 A1 | 1/2010 | Le Moal et al. |
| 2010/0035581 A1 | 2/2010 | Park et al. |
| 2010/0185847 A1 | 7/2010 | Shasha et al. |
| 2011/0145830 A1 | 6/2011 | Yamaguchi |
| 2011/0153566 A1 | 6/2011 | Larson et al. |
| 2011/0196834 A1 | 8/2011 | Kesselman et al. |
| 2011/0219100 A1* | 9/2011 | Dhuse .................... G06F 15/16 709/219 |
| 2011/0261698 A1 | 10/2011 | Kamerkar et al. |
| 2011/0314070 A1* | 12/2011 | Brown .................... G06F 16/16 707/827 |
| 2012/0046807 A1 | 2/2012 | Ruther et al. |
| 2012/0047317 A1 | 2/2012 | Yoon et al. |
| 2012/0066449 A1* | 3/2012 | Colgrove .............. G06F 3/0613 711/114 |
| 2012/0124273 A1 | 5/2012 | Goss et al. |
| 2012/0204265 A1 | 8/2012 | Judge |
| 2012/0278801 A1 | 11/2012 | Nelson et al. |
| 2013/0042156 A1* | 2/2013 | Srinivasan .......... G06F 11/2074 714/54 |
| 2013/0132057 A1 | 5/2013 | Deng et al. |
| 2013/0191836 A1 | 7/2013 | Meyer |
| 2013/0326161 A1 | 12/2013 | Cohen et al. |
| 2014/0019987 A1 | 1/2014 | Verma et al. |
| 2014/0074623 A1 | 3/2014 | Mohammadi et al. |
| 2014/0157276 A1 | 6/2014 | Smithson et al. |
| 2014/0208327 A1 | 7/2014 | Cadambi et al. |
| 2014/0226565 A1 | 8/2014 | Velev et al. |
| 2014/0250438 A1 | 9/2014 | Shin et al. |
| 2014/0282572 A1 | 9/2014 | Kang |
| 2014/0304601 A1 | 10/2014 | Rossano et al. |
| 2015/0127625 A1 | 5/2015 | Bulkowski et al. |
| 2015/0128149 A1 | 5/2015 | Meijer et al. |
| 2015/0237157 A1 | 8/2015 | Wang et al. |
| 2015/0347185 A1 | 12/2015 | Holt et al. |
| 2015/0347211 A1 | 12/2015 | Dang et al. |
| 2015/0347554 A1 | 12/2015 | Vasantham et al. |
| 2016/0149964 A1 | 5/2016 | Pastro |
| 2016/0188376 A1 | 6/2016 | Rosas et al. |
| 2016/0266934 A1 | 9/2016 | Rimoni |
| 2016/0291885 A1 | 10/2016 | Pendharkar et al. |
| 2017/0017676 A1* | 1/2017 | Levy ....................... G06F 16/27 |
| 2017/0031713 A1 | 2/2017 | Campbell et al. |
| 2017/0048021 A1* | 2/2017 | Yanovsky ........... H04L 63/1458 |
| 2017/0109203 A1 | 4/2017 | Liu et al. |
| 2017/0147488 A1 | 5/2017 | Vaquero |
| 2017/0177697 A1 | 6/2017 | Lee et al. |
| 2017/0308403 A1 | 10/2017 | Turull et al. |
| 2017/0374516 A1 | 12/2017 | Huo et al. |
| 2018/0006999 A1 | 1/2018 | Doukhvalov et al. |
| 2018/0041477 A1 | 2/2018 | Shaposhnik |
| 2018/0052710 A1 | 2/2018 | Choi et al. |
| 2018/0101448 A1 | 4/2018 | Ventura et al. |
| 2018/0114290 A1 | 4/2018 | Paltashev et al. |
| 2018/0157543 A1 | 6/2018 | Bellomo et al. |
| 2018/0260125 A1* | 9/2018 | Botes ..................... G06F 3/067 |
| 2018/0293123 A1 | 10/2018 | Kondapalli et al. |
| 2018/0300385 A1 | 10/2018 | Merriman et al. |
| 2019/0163546 A1 | 5/2019 | Ungar et al. |
| 2019/0171763 A1 | 6/2019 | Cai et al. |
| 2020/0252761 A1 | 8/2020 | Podluzhny |
| 2021/0019093 A1* | 1/2021 | Karr ..................... G06F 3/0664 |

FOREIGN PATENT DOCUMENTS

| | | |
|---|---|---|
| EA | 031078 B1 | 11/2018 |
| EP | 2110990 A1 | 10/2009 |
| EP | 1508850 A3 | 3/2015 |
| GB | 2351375 A | 12/2000 |
| RU | 2273105 C2 | 3/2006 |
| RU | 2376635 C2 | 12/2009 |
| RU | 2388039 C2 | 4/2010 |
| RU | 2494453 C2 | 9/2013 |
| RU | 2533638 C2 | 11/2014 |
| RU | 2543558 C2 | 3/2015 |
| RU | 2547705 C2 | 4/2015 |
| RU | 2581551 C2 | 4/2016 |
| RU | 2628146 C2 | 8/2017 |
| RU | 2649788 C1 | 4/2018 |
| RU | 2665212 C2 | 8/2018 |

(56) References Cited

FOREIGN PATENT DOCUMENTS

| RU | 2670573 C2 | 10/2018 |
|---|---|---|
| WO | 2012065018 A2 | 5/2012 |
| WO | 2016197716 A1 | 12/2016 |

OTHER PUBLICATIONS

Notice of Allowance dated Oct. 15, 2020 received in respect of a related U.S. Appl. No. 16/433,186.
Kumar et al, "Optimized Particle Swarm Optimization Based Deadline Constrained Task Scheduling in Hybrid Cloud", ICTACT Journal of Soft Computing, Jan. 2016, Vlume 06, Issue 02, pp. 1117-1122 (Year: 2016).
Shin et al, "Deadline-Guaranteed Scheduling Algorithm with Improved Resource Utilization for Cloud Computing", 12th Annual IEEE Consumer Communications and Networking Conference (CCNC), 2015, pp. 814-819 (Year: 2015).
Chopra et al, "Deadline and Cost based Workflow Scheduling in Hybrid Cloud", 2013, IEEE, pp. 840-846 (Year: 2013).
Yuan et al, "Deadline divison-based heuristic for cost optimization in workflow scheduling". Information Sciences 179 (2009) 2562-2575, Elsevier, pp. 2562-2575 (Year 2009).
Srinivasan et al, "Deadline-based scheduling of periodic task systems on multiprocessors", Information Processing Letters 84 (2002), 93-98, Elsevier, pp. 93-98 (Year: 2002).
Russian Search Report dated Oct. 30, 2019 issued in respect of the Russian Patent Application No. RU2018136221.
Ruemmier "An Introduction to Disk Drive Modeling", Hewlett Packard Laboratories, IEEE, Mar. 1994, pp. 17-29 (Year 1994).
IEEE 100, The Authoritative Dictionary of IEEE Standards Terms, Seventh Edition, IEEE Press, 2000, pp. 245, 1184 (Year: 2000).
Office Action dated Nov. 12, 2020 received in respect of a related U.S. Appl. No. 16/367,537.
Office Action dated Nov. 20, 2020 received in respect of a related U.S. Appl. No. 16/776,011.
Grefen et al. "Two-Layer Transaction Management for Workflow Management Applications", Database and Expert Systems Applications, pp. 430-439, publication date: Sep. 1997430-439.
"Deadline scheduler", retrieved on Wikipedia on Jan. 21, 2019.
"Shortest seek first", retrieved on Wikipedia on Jan. 21, 2019.
"Elevator algorithm", retrieved on Wikipedia on Jan. 21, 2019.
Abeni et al, "Constant Bandwidth Server Revisited", EWiLi'14, Nov. 2014, Lisbon, Portugal.
Virtuozzo Storage 2.3, Installation Guide, Dec. 14, 2017, retrieved from https://docs.virtuozzo.com/virtuozzo_storage_2_installation_guide/planning-virtuozzo-storage-infrastructure/understanding-data-redundancy.html.
Russian Search Report dated Feb. 25, 2020 issued in respect of the Russian Patent Application No. RU2018147497.
Russian Search Report dated Feb. 25, 2010 issued in respect of the Russian Patent Application No. RU2018135460.
Russian Search Report dated Nov. 8, 2019 issued in respect of the Russian Patent Application No. RU2018132711.
Russian Search Report dated Nov. 26, 2019 issued in respect of the Russian Patent Application No. RU2018144176.
Russian Search Report dated Nov. 26, 2019 issued in respect of the Russian Patent Application No. RU2018132714.
Russian Search Report dated Nov. 25, 2019 issued in respect of the Russian Patent Application No. RU2018135452.
Ex Parte Quale Action dated Oct. 22, 2020 received in respect of a related U.S. Appl. No. 16/560,409.
Office Action dated Oct. 23, 2020 received in respect of a related U.S. Appl. No. 16/504,040.
Office Action dated Dec. 4, 2020 received in respect of a related U.S. Appl. No. 16/401,688.
Office Action dated Jan. 1, 2021 received in respect of a related U.S. Appl. No. 16/384,301.
Russian Search Report dated Jan. 18, 2021 issued in respect of the Russian Patent Application No. RU2019103253.
Office Action dated Mar. 10, 2021 received in respect of a related U.S. Appl. No. 16/367,537.

* cited by examiner

METHOD AND DISTRIBUTED COMPUTER SYSTEM FOR PROCESSING DATA

CROSS-REFERENCE

The present application claims priority from Russian Patent Application No. 2018147497, entitled "Method and Distributed Computer System for Processing Data", filed Dec. 29, 2018, the entirety of which is incorporated herein by reference.

FIELD

The present technology relates to distributed data processing and, specifically, to a method and distributed computer system for processing data.

BACKGROUND

Storage requirements for storing digital data are continuously increasing due to the large volume of digital data that is being created everyday. For example, various types of user data, organization data and/or application data may need to be stored. This increases the demand for data storage capacity. Cloud storage systems may provide data storage capacity to users and/or organizations in order to cope with these increasing storage capacity requirements.

Generally speaking, cloud storage is a model of computer storage in which the digital data is stored in logical pools. The physical storage, where the digital data is actually stored, spans multiple servers, possibly located in different locations (i.e. different data centers), and is typically managed by a company hosting cloud storage services. Users and/or organizations usually buy or lease storage capacity from cloud storage service providers in order to store their digital data. In return, cloud storage service providers are responsible for keeping the digital data available and accessible while ensuring that the physical storage is protected for avoiding data loss.

SUMMARY

Developers of the present technology have appreciated certain technical drawbacks associated with prior art.

Developers of the present technology have devised methods and distributed computer systems for processing data that may allow sustaining, in a sense, a "trust" of clients in distributed storage systems.

To better illustrate this, let it be assumed that a given client transmits data to a distributed computer system for storage thereof. If the client does not receive a notification of successful storage of its data by the distributed computer system during a data storage moment in time, the client is not per se "expecting" that data to be retrieved and provided thereto in response to a data access request at a future moment in time. As a result, if ever that data is not recoverable at the future moment in time (due to some failure in the system, for example), the client does not loose "trust" in the ability of the distributed computer system to securely store data since the distributed computer system has not provided the notification of successful storage.

If, however, the client does receive the notification of successful storage of its data during the data storage moment in time, the client is per se "expecting" that data to be retrieved and provided thereto in response to a data access request at a future moment in time. As a result, if the client does receive the notification of successful storage of its data (during data storage), but the distributed computer system is not capable of recovering this data at the future moment in time (due to some failure in the system, for example), the client, in a sense, looses "trust" in the ability of the distributed computer system to securely store data.

Hence, it can be said that "trust" of the client in the distributed computer system is not directed to whether the data is retrievable at the future moment in time, but rather whether the data is retrievable when a notification of successful storage thereof has been provided to the client.

Hence, in some embodiments of the present technology, there are provided methods and distributed computer systems that are configured to issue notifications of successful storage of data to clients under a condition that may ensure that the data is stored in such a way that it is retrievable/recoverable even if a given maximum number of storage devices of the distributed computer system become unavailable at a future moment in time. Put another way, the developers of the present technology have devised methods and distributed computer systems where data is considered to be "successfully stored" (e.g., when the data is confirmed as successfully stored) when that data is guaranteed to be recoverable at a future moment in time even if a maximum number of storage devices are unavailable at that future moment in time.

In some embodiments, as it will become apparent from the description herein further below, methods and distributed computer systems disclosed herein may also help during data access requests to non-ambiguously determine whether the distributed computer system has confirmed successful storage of data to the client during storage of that data. This may be beneficial in some implementations of the present technology since, depending on whether or not the distributed computer system has confirmed, during the data storage moment in time, that the data has been successfully stored, the distributed computer system may be configured to provide different types of responses to the client (for example, if ever the data is not recoverable in response to the data access request).

In one non-limiting example, if the distributed computer system non-ambiguously determines that it did not confirm successful storage of the data, and that during the data access request the data is not recoverable, the distributed computer system may provide a "no data" type of response. Indeed, in this one non-limiting example, the distributed computer system may be configured to provide this first type of response since it did not per se "promise" that the data has been successfully stored.

In another non-limiting example, if the distributed computer system non-ambiguously determines that it did confirm successful storage of the data, and that during the data access request the data is not recoverable, the distributed computer system may provide a "data error" type of response. Indeed, in this another non-limiting example, the distributed computer system may be configured to provide this second type of response since it did per se "promise" that the data has been successfully stored.

In a first broad aspect of the present technology, there is provided a computer-implemented method for implementing a distributed computer system for processing data. The data originates from a client of the distributed computer system. The distributed computer system has a plurality of storage devices and a supervisory computer. The method is executable by the supervisory computer. The method comprises receiving, by the supervisory computer, an indication of a redundancy algorithm to be used for generating redundancy-data based on the data. The redundancy-data is to be stored by a set of storage devices. The redundancy algorithm is indicative of a number of storage devices that need to store the redundancy-data for the data to be recoverable. The method comprises receiving, by the supervisory computer, an indication of a failure-model algorithm to be used for confirming successful storage of the data to the client. Successfully stored data is guaranteed to be recoverable at a future moment in time if a maximum number of storage devices are unavailable at the future moment in time. The method comprises at a data storage moment in time instructing, by the supervisory computer, the set of storage devices to store the redundancy-data. A given storage device is configured to notify the supervisory computer once the redundancy-data is stored thereby. The method comprises at a data access moment time receiving, by the supervisory computer, an indication of an access request for the data. The method comprises at a data access moment time applying, by the supervisory computer, the failure-model algorithm onto notifications received from the set of storage devices for non-ambiguously determining whether a confirmation of successful storage of the data has been provided to the client at the data storage moment in time.

In some embodiments of the method, the successfully stored data is guaranteed to be recoverable at a future moment in time if at least one combination of the maximum number of storage devices is unavailable at the future moment in time.

In some embodiments of the method, the successfully stored data is guaranteed to be recoverable at a future moment in time if at least one combination of storage devices is unavailable at the future moment in time.

In some embodiments of the method, the redundancy algorithm is of a replication-type.

In some embodiments of the method, the redundancy-data comprises replicas of the data.

In some embodiments of the method, the redundancy algorithm is of an erasure-code-type.

In some embodiments of the method, the method further comprises applying, by the supervisory computer, the failure-model algorithm onto notifications received from the set of storage devices during the data storage moment in time for determining whether to provide to the client the confirmation of successful storage of the data.

In some embodiments of the method, the applying the failure-model algorithm during the data storage moment in time comprises iteratively applying the failure-model algorithm during the data storage moment in time onto the notifications received from the storage devices each time a new notification is received.

In some embodiments of the method, the iteratively applying the failure-model algorithm comprises waiting for other storages devices form the set of storage devices to issue new notifications.

In some embodiments of the method, the iteratively applying the failure-model algorithm comprises tracking new notifications issued by other storage devices from the set of storage devices.

In some embodiments of the method, the supervisory computer determines to provide during the data storage moment in time the confirmation of successful storage of the data when a given number of storage devices notify that redundancy-data is stored thereby.

In some embodiments of the method, the given number of storage devices is above the number of storage devices that need to store the redundancy-data for the data to be recoverable.

In some embodiments of the method, the given number of storage devices is between (i) the number of storage devices that need to store the redundancy-data for the data to be recoverable, and (ii) a total number of storages devices in the plurality of storage devices, inclusively.

In some embodiments of the method, the successfully stored data is guaranteed to be recoverable at a future moment in time if different combinations of the maximum number of storage devices are unavailable at the future moment in time.

In some embodiments of the method, the successfully stored data is guaranteed to be recoverable at a future moment in time if different combinations of storage devices are unavailable at the future moment in time.

In some embodiments of the method, the different combinations comprise at least some of all possible combinations amongst the plurality of storage devices.

In some embodiments of the method, in response to non-ambiguously determining that the confirmation of successful storage of the data has been provided to the client at the data storage moment in time, the method further comprises providing a data error type of response to the data access request of the client.

In some embodiments of the method, in response to non-ambiguously determining that the confirmation of successful storage of the data has not been provided to the client at the data storage moment in time, the method further comprises providing a no data type of response to the data access request of the client.

In a second broad aspect of the present technology, there is provided a computer-implemented method for implementing a distributed computer system for processing data. The data originates from a client of the distributed computer system. The distributed computer system has a plurality of storage devices and a supervisory computer. The method is executable by the supervisory computer. The method comprises receiving, by the supervisory computer, an indication of a redundancy algorithm to be used for generating redundancy-data based on the data. The redundancy-data is to be stored by a set of storage devices. The redundancy algorithm is indicative of a number of storage devices that need to store the redundancy-data for the data to be recoverable. The method comprises receiving, by the supervisory computer, an indication of a failure-model algorithm to be used for confirming successful storage of the data to the client. Successfully stored data is guaranteed to be recoverable at a future moment in time if at least one combination of storage devices is unavailable at the future moment in time. The method comprises at a data storage moment in time instructing, by the supervisory computer, the set of storage devices to store the redundancy-data. A given storage device is configured to notify the supervisory computer once the redundancy-data is stored thereby. The method comprises at a data access moment time receiving, by the supervisory computer, an indication of an access request for the data. The method comprises at a data access moment time applying, by the supervisory computer, the failure-model algorithm onto notifications received from the set of storage devices for non-ambiguously determining whether a confirmation of successful storage of the data has been provided to the client at the data storage moment in time.

In a third broad aspect of the present technology, there is provided a distributed computer system for processing data. The data originates from a client of the distributed computer system. The distributed computer system has a plurality of storage devices and a supervisory computer. The supervisory computer is configured to receive an indication of a redundancy algorithm to be used for generating redundancy-data based on the data. The redundancy-data is to be stored by a set of storage devices. The redundancy algorithm is indicative of a number of storage devices that need to store the redundancy-data for the data to be recoverable. The supervisory computer is configured to receive an indication of a failure-model algorithm to be used for confirming successful storage of the data to the client. Successfully stored data is guaranteed to be recoverable at a future moment in time if a maximum number of storage devices are unavailable at the future moment in time. The supervisory computer is configured to at a data storage moment in time instruct the set of storage devices to store the redundancy-data. A given storage device is configured to notify the supervisory computer once the redundancy-data is stored thereby. The supervisory computer is configured to at a data access moment time receive an indication of an access request for the data. The supervisory computer is configured to at a data access moment time apply the failure-model algorithm onto notifications received from the set of storage devices for non-ambiguously determining whether a confirmation of successful storage of the data has been provided to the client at the data storage moment in time.

In some embodiments of the distributed computer system, the successfully stored data is guaranteed to be recoverable at a future moment in time if at least one combination of the maximum number of storage devices is unavailable at the future moment in time.

In some embodiments of the distributed computer system, the successfully stored data is guaranteed to be recoverable at a future moment in time if at least one combination of storage devices is unavailable at the future moment in time.

In some embodiments of the distributed computer system, the redundancy algorithm is of a replication-type.

In some embodiments of the distributed computer system, the redundancy-data comprises replicas of the data.

In some embodiments of the distributed computer system, the redundancy algorithm is of an erasure-code-type.

In some embodiments of the distributed computer system, the supervisory computer is further configured to apply the failure-model algorithm onto notifications received from the set of storage devices during the data storage moment in time for determining whether to provide to the client the confirmation of successful storage of the data.

In some embodiments of the distributed computer system, to apply the failure-model algorithm during the data storage moment in time comprises the supervisory computer configured to iteratively apply the failure-model algorithm during the data storage moment in time onto the notifications received from the storage devices each time a new notification is received.

In some embodiments of the distributed computer system, to iteratively apply the failure-model algorithm comprises the supervisory computer configured to wait for other storages devices form the set of storage devices to issue new notifications.

In some embodiments of the distributed computer system, to iteratively apply the failure-model algorithm comprises the supervisory computer configured to track new notifications issued by other storage devices from the set of storage devices.

In some embodiments of the distributed computer system, the supervisory computer determines to provide during the data storage moment in time the confirmation of successful storage of the data when a given number of storage devices notify that redundancy-data is stored thereby.

In some embodiments of the distributed computer system, the given number of storage devices is above the number of storage devices that need to store the redundancy-data for the data to be recoverable.

In some embodiments of the distributed computer system, the given number of storage devices is between (i) the number of storage devices that need to store the redundancy-data for the data to be recoverable, and (ii) a total number of storages devices in the plurality of storage devices, inclusively.

In some embodiments of the distributed computer system, the successfully stored data is guaranteed to be recoverable at a future moment in time if different combinations of the maximum number of storage devices are unavailable at the future moment in time.

In some embodiments of the distributed computer system, the successfully stored data is guaranteed to be recoverable at a future moment in time if different combinations of storage devices are unavailable at the future moment in time.

In some embodiments of the distributed computer system, the different combinations comprise at least some of all possible combinations amongst the plurality of storage devices.

In some embodiments of the distributed computer system, in response to non-ambiguously determining that the confirmation of successful storage of the data has been provided to the client at the data storage moment in time, the supervisory computer is further configured to provide a data error type of response to the data access request of the client.

In some embodiments of the distributed computer system, in response to non-ambiguously determining that the confirmation of successful storage of the data has not been provided to the client at the data storage moment in time, the supervisory computer is further configured provide a no data type of response to the data access request of the client.

In a fourth broad aspect of the present technology, there is provided a distributed computer system for processing data. The data originates from a client of the distributed computer system. The distributed computer system has a plurality of storage devices and a supervisory computer. The supervisory computer is configured to receive an indication of a redundancy algorithm to be used for generating redundancy-data based on the data. The redundancy-data is to be stored by a set of storage devices. The redundancy algorithm is indicative of a number of storage devices that need to store the redundancy-data for the data to be recoverable. The supervisory computer is configured to receive an indication of a failure-model algorithm to be used for confirming successful storage of the data to the client. Successfully stored data is guaranteed to be recoverable at a future moment in time if at least one combination of storage devices is unavailable at the future moment in time. The supervisory computer is configured to at a data storage moment in time instruct the set of storage devices to store the redundancy-data. A given storage device is configured to notify the supervisory computer once the redundancy-data is stored thereby. The supervisory computer is configured to at a data access moment time receive an indication of an access request for the data. The supervisory computer is configured to at a data access moment time apply the failure-model algorithm onto notifications received from the set of storage devices for non-ambiguously determining whether a confirmation of successful storage of the data has been provided to the client at the data storage moment in time.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The present detailed description is intended to be only a description of illustrative examples of the present technology. This description is not intended to define the scope nor set forth the bounds of the present technology.

Further, where this has not been done (i.e. where no examples of modifications have been set forth), it should not be interpreted that no modifications are possible and/or that what is described is the sole manner of implementing that particular aspect of the present technology. In addition it is to be understood that the present detailed description provides in certain instances simple implementations of the present technology, and that where such is the case they have been presented in this manner as an aid to understanding. Various implementations of the present technology may be of a greater complexity.

Figure 1:
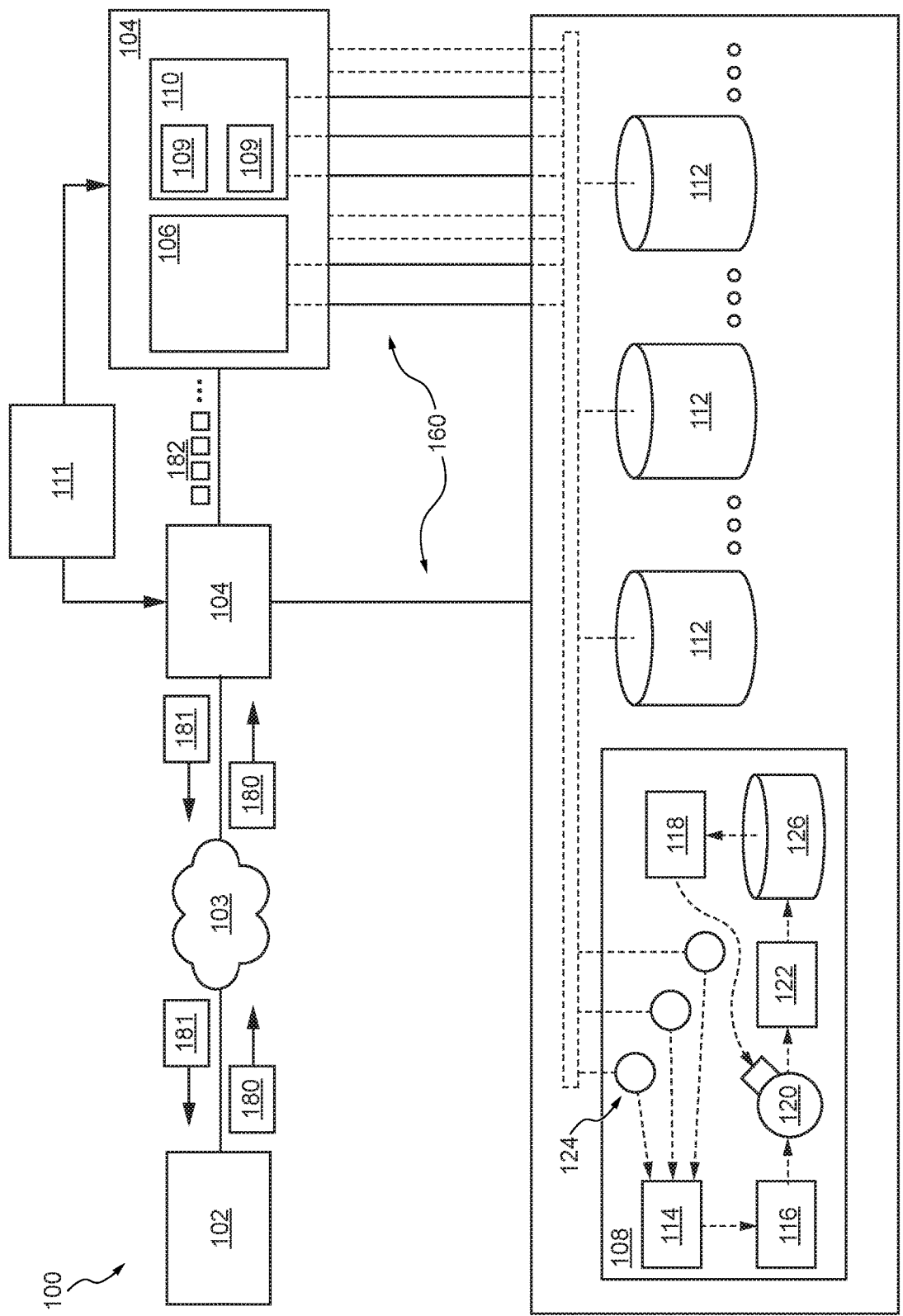
FIG. 1 depicts a system suitable for implementing non-limiting embodiments of the present technology.

Referring to FIG. 1, there is depicted a distributed computer-processing system 100 or a "distributed processing system" 100, for short. The distributed processing system 100 is configured for implementing non-limiting embodiments of the present technology. It is to be expressly understood that the distributed processing system 100 as depicted is merely an illustrative implementation of the present technology. Thus, the description thereof that follows is intended to be only a description of illustrative examples of the present technology. This description is not intended to define the scope or set forth the bounds of the present technology.

In some cases, what are believed to be helpful examples of modifications to the distributed processing system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the distributed processing system 100 may provide in certain instances simple implementations of the present technology, and that where such is the case they have been presented in this manner as an aid to understanding. As persons skilled in the art would understand, various implementations of the present technology may be of a greater complexity.

The distributed processing system 100 comprises a request source 102, a communication network 103, a request pre-processing sub-system 104, a transaction processing sub-system 105, a transaction routing sub-system 106, a distributed storage sub-system 108, a database sub-system 110, and an operational sub-system 111.

How the above listed components of the distributed processing system 100 are implemented in accordance to the various non-limiting embodiments of the present technology will now be described.

Request Source

The request source 102 may be an electronic device associated with an end user (e.g., a client device) or, alternatively, any other sub-system of the distributed processing system 100 that is configured to provide user requests for the distributed processing system 100. It should be expressly understood that even though FIG. 1 depicts only a single instance of the request source 102, the distributed processing system 100 may have multiple instances of the request source 102. As illustrated herein, the request source 102 is part of the distributed processing system 100; however, in some embodiments of the present technology, the request source 102 may be external to the distributed processing system 100, and connected via a communication link (not numbered).

In fact, a typical implementation of the distributed processing system 100 can include a large number of request sources 102, such as hundred instances, thousand instances, million instances, and the like.

In some embodiments of the present technology, where the distributed processing system 100 is employed in a business-to-customer (B2C) environment, the request source 102 may be a given client device, such as a smartphone, for example, associated with a given user of the distributed processing system 100. For example, the distributed processing system 100 may potentially provide cloud storage services for the given client device of the given user.

In other embodiments of the present technology, where the distributed processing system 100 is employed in a business-to-business (B2B) environment, the request source 102 may be a given sub-system, such as a remote server, for example, providing user requests to the distributed processing system 100. For example, in some embodiments of the present technology, the distributed processing system 100 may provide fault-tolerant data processing and/or storage services for an operator of the given sub-system.

Broadly speaking, irrespective of whether the distributed processing system 100 is implemented as a B2C or a B2B system (or any other variation of the system for that matter), the request source 102 may be a given client device or another sub-system which can be internal or external to the distributed processing system 100.

As mentioned above, the request source 102 is configured to issue a plurality of requests 180, each of which will be referred herein below as the request 180. The nature of the request 180 will depend on a type of the request source 102. However, one example of the request 180 is a query expressed in Structured Query Language (SQL). Therefore, it is contemplated that in some embodiments of the present technology, the request 180 may be expressed in a declarative programming language, which means that the request 180 may be a declarative-type request.

Generally speaking, declarative programming is a style of building a structure and elements of computer programs that expresses the logic of a computation without describing a control flow thereof. Common declarative programming languages include, but are not limited to, SQL, XQuery and other database query languages. Broadly speaking, a declarative-type request is one that specifies an action in terms of "what" needs to be executed, as opposed to how "how" it needs to be executed.

This means that a given declarative-type request may be associated with a given condition under which a given action should be executed. The given condition may be, for example, a condition on which entity the given action is to be executed or where to obtain values for the given action to be executed.

As non-limiting examples, the given declarative-type request can be formulated such as: "Upsert a value of 5 in a cell associated with a key that is equal to a value of a cell associated with a key A" and "For all keys associated with a cell having a value of 5, replace that value with a value 10". However, it should be understood that examples of declarative languages and examples of declarative-type requests have been provided above for ease of illustration only, and that other declarative languages and other declarative-type requests may be used by the request source 102, without departing from the scope of the present technology.

In some embodiments of the present technology, the request source 102 is also configured to receive a plurality of responses 181, each of which will be referred herein below as the response 181. Generally speaking, in response to the request 180 being processed (or potentially not processed) by the distributed processing system 100, the distributed processing system 100 may generate the response 181 destined to the request source 102 associated with the respective request 180. The nature of the response 181 will depend on inter alia a type of the request source 102, the type of the respective request 180 and whether the distributed processing system 100 processed (or potentially not processed) the respective request 180. In some embodiments of the present technology, the distributed processing system 100 may generate the response 181 only in case of a failure to process the request, only in case of a successful processing of the request, or both.

In one example, during processing of the request 180, the distributed processing system 100 may be configured to request additional data from the request source 102 for continuing or completing processing of the request 180. In such a case, the distributed processing system 100 may be configured to generate the response 181 in a form of a data-request message being indicative of additional data requested by the distributed processing system 100 for continuing or completing the processing of the request 180.

In another example, if the distributed processing system 100 successfully processed the respective request 180, the distributed processing system 100 may be configured to generate the response 181 in a form of a success message being indicative of successful processing of the respective request 180.

In a further example, if the distributed processing system 100 failed to successfully process the respective request 180, the distributed processing system 100 may be configured to generate the response 181 in a form of a failure message being indicative of failed processing of the respective request 180. In such a case, the request source 102 may be configured to perform additional actions such as, but not limited to, re-issuing the request 180, performing diagnostic analyzes for identifying the reason of failed processing of the request 180 by the distributed processing system 100, issuing a new request destined to the distributed processing system 100, and the like.

Communication Network

The request source 102 is communicatively coupled to the communication network 103 for providing the request 180 to the distributed processing system 100 and for receiving the response 181 from the distributed processing system 100. In some non-limiting embodiments of the present technology, the communication network 103 can be implemented as the Internet. In other non-limiting embodiments of the present technology, the communication network 103 can be implemented differently, such as any wide-area communication network, local-area communication network, a private communication network and the like. How a communication link (not separately numbered) between the request source 102 and the communication network 103 is implemented will depend on inter alia how the request source 102 is implemented.

Merely as an example and not as a limitation, in those embodiments of the present technology where the request source 102 is implemented as a wireless communication device (such as a smartphone), the communication link can be implemented as a wireless communication link (such as but not limited to, a 3G communication network link, a 4G communication network link, Wireless Fidelity, or WiFi® for short, Bluetooth® and the like). In those examples where the request source 102 is implemented as a remote server, the communication link can be either wireless (such as Wireless Fidelity, or WiFi® for short, Bluetooth® or the like) or wired (such as an Ethernet based connection).

It should be noted that the communication network 103 is configured to transmit inter alia a request data-packet comprising the request 180 from the request source 102 to the request pre-processing sub-system 104 of the distributed processing system 100. For example, this request data-packet may comprise computer-executable instructions written in a given declarative-type programming language which represent the request 180. The communication network 103 is also configured to transmit inter alia a response data-packet comprising the response 181 from the distributed processing system 100 to the request source 102. For example, this response data-packet may comprise computer-executable instructions representing the response 181.

However, it is contemplated that, in some embodiments of the present technology, where the request source 102 is a given sub-system of the distributed processing system 100, for example, the communication network 103 may be implemented in a different manner from what is described above or, in some cases, may even be omitted, without departing from the scope of the present technology.

Operational Sub-System (Hive)

As mentioned above, the distributed processing system 100 comprises the operational sub-system 111, or simply "the hive", for short. Generally speaking, the hive 111 is a given software-based application (for example, a state machine) that is configured to manage at least some sub-systems of the distributed processing system 100, such as the request pre-processing sub-system 104, and the transaction processing sub-system 105, for example. It can be said that the hive 111 may be embodied as a given State Machine (SM) that is configured to generate, delete and/or balance load of other SMs forming the at least some sub-systems of the distributed processing system 100.

It should be understood that a given SM is a computational model employed by computer systems and which is defined by a list of "states". The given SM may change its current state in response to some external input and may be in exactly one state at any given moment in time. A change from a given state to another state of the given SM is called a "state transition".

It should be noted that, in the context of the present technology, the SMs forming the at least some sub-systems of the distributed processing system 100 are deterministic in nature, that is, each state transition of each such SM is uniquely determined by (i) a current state of a respective SM and (ii) a given external input provided to the respective SM. In other words, for a given current state of the respective SM and for a given external input, there is a unique next state of the respective SM. This deterministic nature of the state transition is true irrespective of which SM of the distributed processing system 100 is undergoing the state transition.

Therefore, as it will be described further below, in some embodiments of the present technology, the distributed processing system 100 may need to receive external inputs of a particular type that satisfy this deterministic property of the SMs of the at least some sub-systems of the distributed processing system 100.

Distributed Storage Sub-System

As mentioned above, the distributed processing system 100 also comprises the distributed storage sub-system 108. Generally speaking, the distributed storage sub-system 108 is configured to inter alia store "system data" indicative of states, state transitions, external inputs and/or outputs of at least some of the SMs of the distributed processing system 100. For example, the system data associated with a given SM of the distributed processing system 100 may be stored in a form of a log, and where the log is indicative of a historical listing of states, state transitions, external inputs and/or outputs of the given SM.

The distributed storage sub-system 108 is also configured to store "client data"—i.e. data associated with the processed external inputs by the distributed processing system 100. For example, in some embodiments of the present technology, client data may be stored as part of the system data in the distributed storage sub-system 108 without departing from the scope of the present technology.

In order to store the system data and/or the client data, the distributed storage sub-system 108 comprises a plurality of storage devices 112, each of which will be referred herein below as the storage device 112. In accordance with the various embodiments of the present technology, some or all of the plurality of storage devices 112 can be located in a single location or distributed amongst different locations. For example, some or all of the plurality of storage devices 112 can be located in a single server rack and/or a single data center and/or distributed over a plurality of server racks in one or more data centers.

In some embodiments of the present technology, the system data and/or the client data stored by a given storage device 112 may be replicated and stored on more than one other storage devices 112. In these embodiments, such replication and storing of the system data and/or the client data may result in a fault-tolerant storage of the system data and/or the client data by the distributed processing system 100. Fault-tolerant storage of the system data and/or the client data may allow preventing data loss in cases where a given storage device 112 of the distributed storage sub-system 108 becomes, temporarily or permanently, unavailable for storage and data retrieval purposes. Also, this fault-tolerant storage of the system data and/or the client data may allow preventing data loss in cases where a given SM of the distributed processing system 100 becomes, temporarily or permanently, unavailable.

It is contemplated that the storage device 112 may be implemented as a computer server. The computer server comprises at least one physical memory device (i.e. a memory drive 126) and hosts one or more software applications configured to execute computer-readable instructions. The memory drive 126 can be executed as solid state drive (SSD), hard disk drive (HDD), or the like. Therefore, it can be said that the at least one physical memory device can be implemented as either a movable disk type device or a immovable (static) disk type device.

For example, as depicted in FIG. 1, a given storage device 112 may be configured to host software applications, such as, but not limited to: (i) a virtual-drive (Vdrive) application 114, a physical-drive (Pdrive) application 115, at least one drive model application 118, at least one operation scheduling application 120, a real-time operation enforcing application 122, and at least one SM proxy 124. Functionalities of the above listed software applications and of the memory drive 126 for storing at least some system data and/or the client data will be described in greater detail further below with reference to FIG. 2.

Request Pre-Processing Sub-System

As previously alluded to, the transaction processing sub-system 105 may be formed by a number of deterministic SMs that require receiving external inputs of a particular type and which satisfy the deterministic property of the deterministic SMs. It should also be recalled that the request source 102 issues the request 180 in a form of a declarative-type request.

As such, the request pre-processing sub-system 104 is configured to receive the request 180, which is the declarative-type request originated from the request source 102, and to pre-process/translate the request 180 into a plurality of deterministic transactions 182 that satisfy the deterministic property of the number of deterministic SMs forming the transaction processing sub-system 105.

Therefore, broadly speaking, the purpose of the request pre-processing sub-system 104 is to ensure that the transaction processing sub-system 105 is able to process the request 180 by pre-processing/translating the request 180 into a plurality of transactions that are processable by the deterministic SMs of the transaction processing sub-system 105.

It should be noted that the request pre-processing sub-system 104 is also configured to generate the response 181 to be transmitted to the request source 102. Indeed, the request pre-processing sub-system 104 is communicatively coupled to the transaction processing sub-system 105, not only to transmit thereto the plurality of deterministic transactions 182, but also to receive therefrom information regarding processing of the plurality of deterministic transaction 182. In some of the non-limiting embodiments of the present technology, the plurality of deterministic transactions 182 can be of one or more of any of a "write" type and a "read" type.

In some embodiments of the present technology, the request pre-processing sub-system 104 is implemented as at least one SM, without departing from the scope of the present technology.

In some embodiments of the present technology, it is contemplated that the distributed computer-processing system 100 of FIG. 1 may support ACID transactions. Broadly speaking, ACID (atomicity, consistency, isolation and durability) is an acronym for a set of transaction properties which are directed to maintain database reliability when transactions are executed. Therefore, in some embodiments of the present technology, it is contemplated that transactions destined to the transaction processing sub-system 105 may be atomical, consistent, isolated and durable, without departing from the scope of the present technology.

Transaction Processing Sub-System

Generally speaking, the transaction processing sub-system 105 is configured to receive and process the plurality of deterministic transactions 182, thereby processing the request 180 of the request source 102. The transaction processing sub-system 105 includes (i) the transaction routing sub-system 106 and (ii) the database sub-system 110, which will now be described in turn.

The database sub-system 110 includes a plurality of transaction destination locations (TDLs) and is partitioned into a plurality of shards 109, each of which will be referred herein below as the shard 109. In one non-limiting example, the database sub-system 110 may host a database having a given database table (or more than one). The given database table may be composed of at least two columns, such as a first column having keys and a second column having records that store data in association with the respective keys. In this non-limiting example, a given TDL may correspond to a given row of the given database table, that is, the given TDL may correspond to a given key and a respective record in the given database table.

As such, in this non-limiting example, each shard 109 of the database sub-system 110 hosts a portion of the given database table. Hence, the given plurality of TDLs, corresponding to the respective rows of the given database table, is split between the plurality of shards 109 such that each shard 109 comprises a respective subset (e.g. range) of the given plurality of TDLs.

In some embodiments of the present technology, it is contemplated that each one of the plurality of shards 109 may be implemented by a respective deterministic SM. This means that, upon receiving a given transaction destined to a TDL of a given shard 109 implemented by a given SM, the given SM may process the transaction and thereby transition to a new state thereof from a current state thereof based on the given transaction, as explained above.

The transaction routing sub-system 106 is configured to route transactions from the plurality of deterministic transaction 182 to respective transaction destination locations TDLs and, therefore, to the respective shards 109 of the database sub-system 110. To that end, the transaction routing sub-system 106 may be formed by a plurality of ports that are generally configured to (i) receive the plurality of deterministic transactions 182 from the request pre-processing sub-system 104, (ii) order the plurality of deterministic transactions 182 into subsets of deterministic transactions destined to respective shards 109, and (iii) generate centralized per-shard orders for execution by the respective shards 109 of the deterministic transactions in each one of the centralized per-shard orders of execution.

It should be noted that each one of the plurality of ports forming the transaction routing sub-system 106 may be implemented as a respective SM. In some embodiments, it is contemplated that the plurality of ports may comprise two different types of ports for routing transactions from the plurality of deterministic transactions 182 to the respective shards 109. In other embodiments, at least some functionalities of the plurality of ports may be executed by the SMs corresponding to the plurality of shards 109.

Also, as depicted in FIG. 1, at least some of the SMs of the transaction processing sub-system 105 may be communicatively coupled to the distributed storage sub-system 108 by a respective communication link 160. Broadly speaking, the purpose of a given communication link 160 is to convey system data indicative of inter alia states, state transitions, external inputs and/or outputs of respective SMs to the distributed storage sub-system 108 for storage thereof. How the communication links 160 are established and how the distributed storage sub-system 108 is configured to store the system data will now be described in greater detail with reference to FIG. 2.

Figure 2:
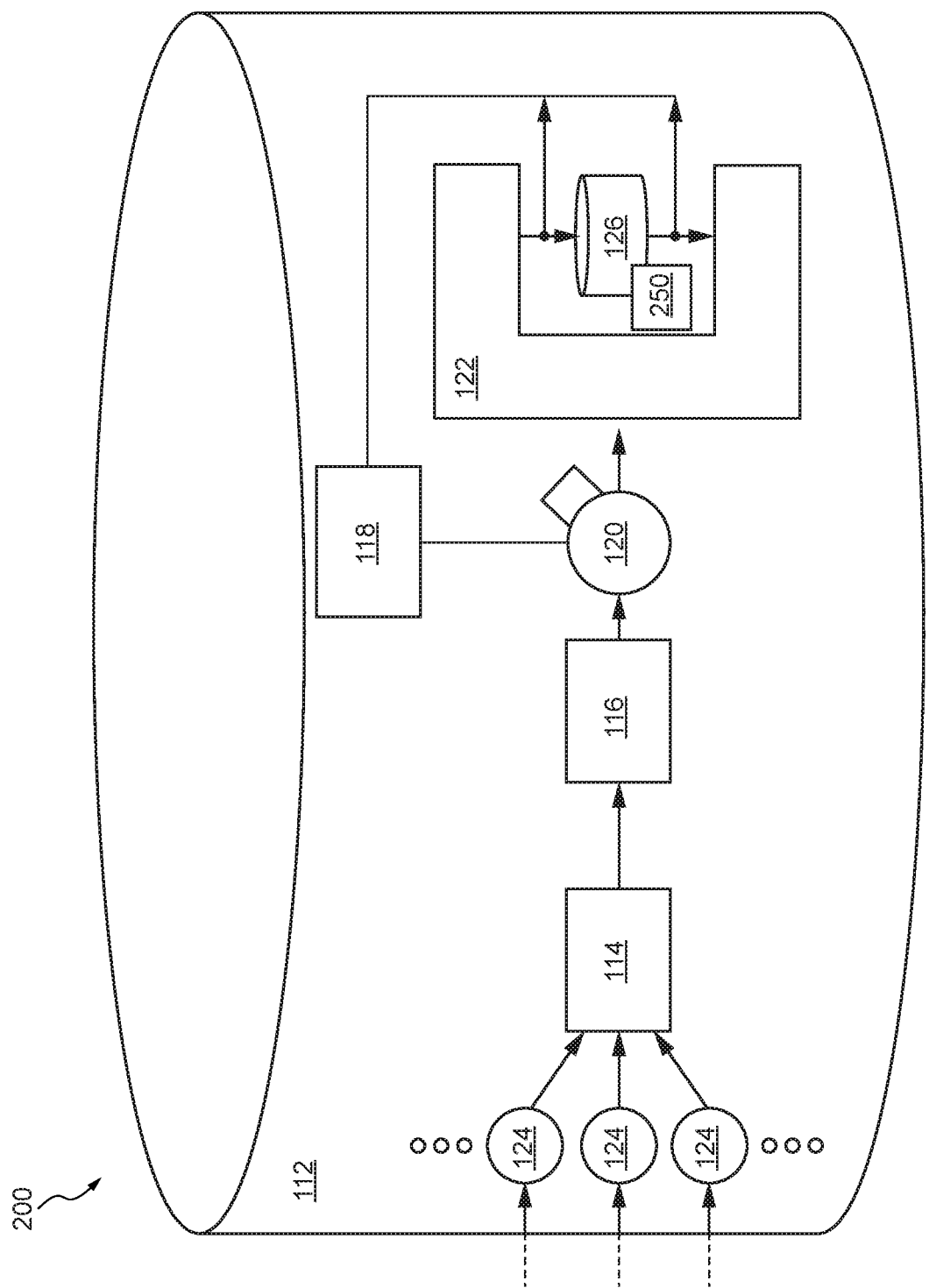
FIG. 2 depicts a storage device of a distributed storage sub-system of FIG. 1 implemented in accordance with some embodiments of the present technology.

In FIG. 2, there is depicted the storage device 112 which is part of the distributed storage sub-system 108. As previously mentioned, the storage device 112 comprises the at least one SM proxy 124. The purpose of a given SM proxy is to manage communication between a given SM and the distributed storage sub-system 108. In some embodiments of the present technology, it is contemplated that the at least one SM proxy 124 of the storage device 112 may be an Application Programing Interface (API) managing communication between a given SM and the storage device 112. In other embodiments of the present technology, the at least one SM proxy 124 itself can be implemented as a SM. In other embodiments of the present technology, the at least one SM proxy 124 can be implemented as a software module (not in itself a SM) for executing functions described immediately above.

In some embodiments of the present technology, a given SM proxy 124 may be configured to (i) receive system data indicative of a log update of a given SM via a respective communication link 160, (ii) process the system data, and (iii) transmit the processed system data to a respective Vdrive application 114 for further processing.

The at least one SM proxy 124 may be configured to process the system data, for example, for ensuring consistency and fault-tolerance of the system data. It is contemplated that the at least one SM proxy 124 may be configured to perform erasure-coding of system data, in some embodiments of the present technology. Broadly speaking, erasure-coding is an encoding method in which data is provided with redundancy and is then split into several fragments. Such redundancy provision and fragmentation may facilitate restoration of data if one ore more fragments are lost due to faults in a given system.

It is contemplated that the so-processed system data by the at least one SM proxy 124 is received by the at least one respective Vdrive application 114 of the storage device 112. The purpose of a given Vdrive application 114 is to process the system data received from the at least one SM proxy 124 and, in response, generate corresponding I/O operations that are to be executed by the memory drive 126 for storing the system data on the memory drive 126 of the storage device 112. Once the at least one Vdrive application 114 generates the I/O operations corresponding to the system data received thereby, the at least one Vdrive application 114 then transmits the I/O operations to the Pdrive application 116.

As such, it is contemplated that a given storage device 112 may have more than one SM proxies 124 for processing and transmitting system data to more than one respective Vdrive application 114, which in turn process the system data, generate respective I/O operations, and transmit the respective I/O operations to a single Pdrive application 116 of the storage device 112.

Broadly speaking, the purpose of the Pdrive application 116 is to control operation of the memory drive 126. For example, the Pdrive application 116 may be configured to perform encoding of I/O operations to be executed on the memory drive 126 and various other functionalities that facilitate reliable storage of data on the memory drive 126.

The Pdrive application 116 is commutatively coupled to the operation scheduling application 120 to transmit thereto the I/O operations. The operation scheduling application 120 is configured for scheduling the transmission of the I/O operations to the memory drive 126. It is contemplated that the operation scheduling application 120, or simply "scheduler" for short, may execute various scheduling schemes for determining an order in which the I/O operations are to be transmitted to the memory drive 126 for further execution.

It is contemplated that, in some embodiments of the present technology, the operation scheduling application 120 may be implemented as part of the Pdrive application 116. In other words, execution of various scheduling schemes may be performed by the Pdrive application 116, without departing from the scope of the present technology.

It is contemplated that, the operation scheduling application 120 may provide a hybrid scheduling scheme. For example, the operation scheduling application 120 may provide a scheduling scheme that is of a "fair" type and, under certain conditions, is also of a "real-time" type.

It should be noted that a given storage device 112 may require to store I/O operations corresponding to system data associated with more than one SMs. Also, each one of the more than one SMs is associated with a pre-determined proportion of drive bandwidth that the memory drive 126 may allocate for executing the I/O operations associated with that respective SM. Therefore, broadly speaking, fair-type scheduling schemes are configured to order the I/O operations to be transmitted to the memory drive 126 such that the drive bandwidth of the memory drive 126 for executing the ordered I/O operations is used in accordance with the pre-determined proportions associated with the more than one SMs.

It should be recalled that the distributed processing system 100 may be employed for providing cloud storage services. In many such implementations, it may be desirable to process system data and store it according to real-time requirements or, in other words, within a very short interval of time. As such, in order to support real-time requirements of the distributed processing system 100, the I/O operations may be associated with respective deadlines that are indicative of a moment in time after which the execution of the respective I/O operations is no longer performed within an acceptable amount of time for supporting real-time requirements of the distributed processing system 100. Therefore, broadly speaking, real-time scheduling schemes are configured to order the I/O operations to be transmitted to the memory drive 126 such that the I/O operations are to be executed by the memory drive 126 within respectively associated deadlines.

In summary, the operation scheduling application 120 may provide a hybrid scheduling scheme that is able to order the I/O operations for transmission of the memory drive 126 for execution such that the pre-determined proportions of drive bandwidth for each respective SM is respected and that respective deadlines of the I/O operations are also respected.

As previously mentioned, the memory drive 126 is a storage medium for executing I/O operations and thereby storing system data transmitted to the storage device 112. For example, the memory drive 126 may be implemented as an HDD or an SSD. The memory drive 126 includes a drive-internal logic 250 for selecting a given I/O operation for current execution amongst all I/O operations transmitted thereto.

It should be noted that I/O operations may potentially be sent one-by-one for execution to the memory drive 126, but this would result in an increased latency between the memory drive 126 and other components of the storage device 112. Therefore, the I/O operations may also be transmitted in batches or groups of I/O operations to the memory drive 126. Once a batch or group of I/O operations is received by the memory drive 126, the drive-internal logic 250 is configured to select amongst the I/O operations available thereto (from the batch) a most efficient I/O operation for execution.

For example, the most efficient I/O operation may be selected based on a variety of criteria such as, for example, a location where a previous I/O operation has been executed on the memory drive 126 and locations of the I/O operations available to the memory drive 126 where they are ought to be executed on the memory drive 126. In other words, the drive-internal logic 250 is configured to select, for a current execution, a most efficient one (from the perspective of the memory drive 126) amongst all the I/O operations available to the memory drive 126 at a given moment in time.

For that reason, in some cases, although the operation scheduling application 120 may have ordered I/O operations in a specific order of transmission for respecting the real-time requirements of the distributed processing system 100, the drive-internal logic 250 of the memory drive 126 may instruct the memory drive 126 to organize them in an execution order that is different from the transmission order selected by the operation scheduling application 120. Therefore, it may happen that the execution order may no longer respect the real-time requirements of the distributed processing system 100 (especially as additional I/O operations are received from the operation scheduling application 120, which additional I/O operations may be more "efficient" from the perspective of the memory drive 126 and that may be picked over non-yet-executed I/O operations).

In order to ensure real-time operation of the storage device 112 and to avoid the above-described problem (which is also known as "operation stagnation"), the storage device 112 may include the real-time operation enforcing application 122. Broadly speaking, the real-time operation enforcing application 122 allows controlling which I/O operations amongst those that have been already ordered by the operation scheduling application 120 are transmitted at any given time to the memory drive 126 for execution.

It is contemplated that, in some embodiments of the present technology, the real-time operation enforcing application 122 may be implemented as part of the Pdrive application 116. In other words, the above-mentioned functionalities of the real-time operation enforcing application 122 may be performed by the Pdrive application 116, without departing from the scope of the present technology.

The storage device 112 is also configured to host at least one respective drive model application 118 for each memory drive 126 of the storage device 112. Broadly speaking, the drive model application 118 is configured to emulate ideal operation of the memory drive 126 for diagnostic analyses of the memory drive 126. In other embodiments, however, the operation scheduling application 120 may also be configured to employ the drive model application 118 for ordering the I/O operations for transmission to the memory drive 126.

It is contemplated that, in some embodiments of the present technology, the at least one respective drive model application 118 may be implemented as part of the Pdrive application 116. In other words, the above-mentioned functionalities of the at least one respective drive model application 118 may be performed by the Pdrive application 116, without departing from the scope of the present technology.

Distributed Computer System

Figure 3:
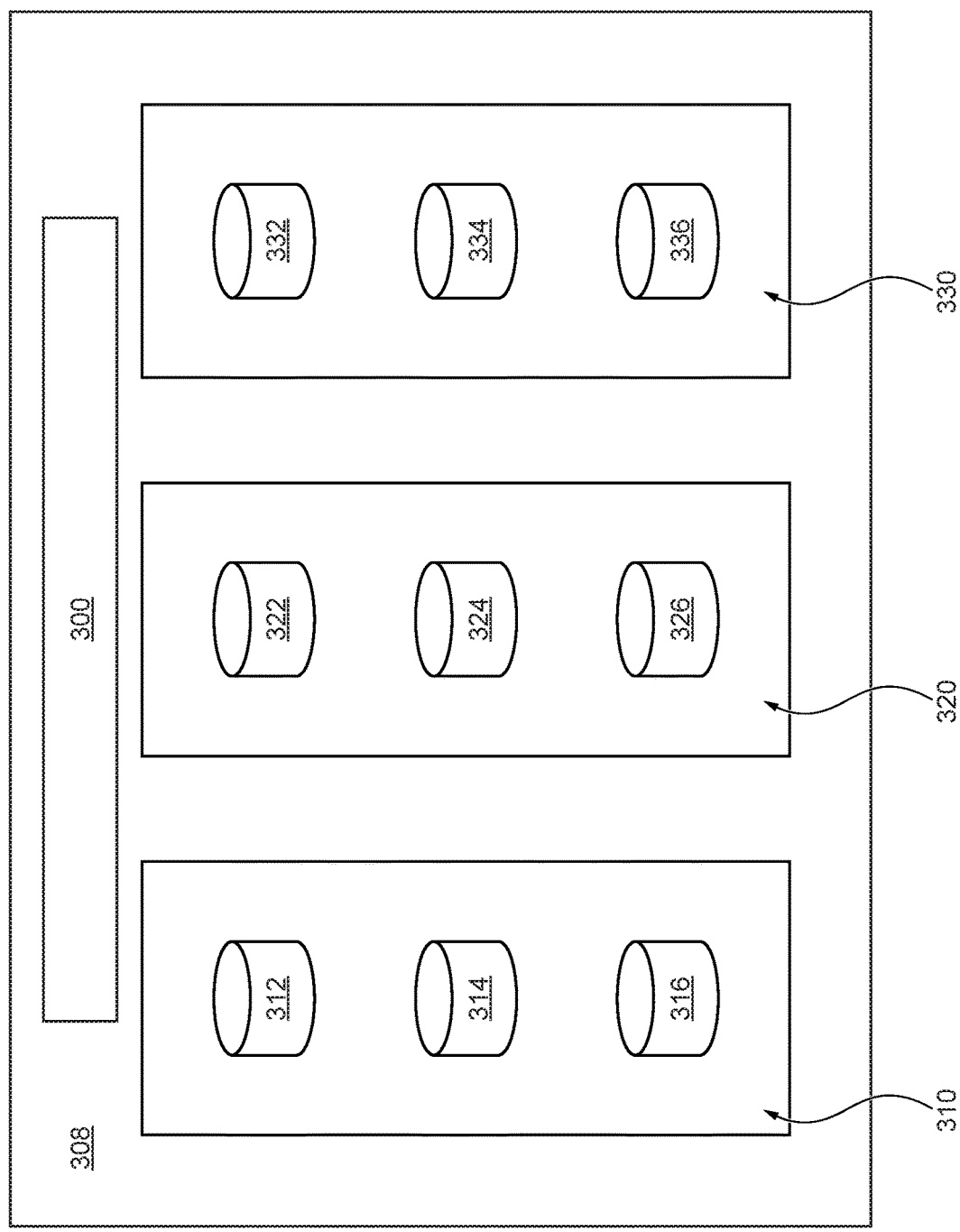
FIG. 3 depicts a distributed computer system implemented in accordance with non-limiting embodiments of the present technology.

In some embodiments of the present technology, there is provided a distributed computer system 308 depicted in FIG. 3. It is contemplated that the distributed computer system 308 may be implemented as the distributed storage sub-system 108 of the distributed processing system 100 depicted in FIG. 1.

The purpose of the distributed computer system 308 is to store data provided by a client of the distributed computer system 308, and to retrieve this data in response to data access requests. The client may be embodied as a given SM of the distributed processing system 100, for example. In other embodiments, it is contemplated that the data to be stored may be associated with the request source 102 of the distributed processing system 100.

The distributed computer system 308 has a plurality of storage devices (not numbered) that is split across different storage groups. For example, a first storage device 312, a second storage device 314, and a third storage device 316 may be in a first storage group 310. Similarly, a fourth storage device 322, a fifth storage device 324, and a sixth storage device 326 may be in a second storage group 320. By the same token, a seventh storage device 332, an eighth storage device 334, and a ninth storage device 336 may be in a third storage group 330. It is contemplated that more or fewer than three storage devices may be included in a given storage group and that a number of storage devices in a given storage group may depend on inter alia different implementations of the present technology.

Broadly speaking, a given storage group may be any common location or infrastructure where a failure at this common location or infrastructure may cause its storage devices (one, some, or all) to fail. In some non-limiting examples, a given storage group may be a data center, a server rack, a storage server hosting a number of storage devices, and the like. A given storage group may also include other components (in addition to the storage devices depicted in FIG. 3) such as, but not limited to: power supplies, communication-enabling components, redundant or back-up components, environmental control components such as air conditioning systems, fire-suppression systems, and the like. Storage groups typically include such additional components in order to avoid failure scenarios where a failure in the given storage group renders one or more storage devices of that group unavailable and which may lead to data corruption or loss.

In addition to the first storage group 310, the second storage group 320 and the third storage group 330 (e.g., the plurality of storage devices), the distributed computer system 308 has a supervisory computer 300. The supervisory computer 300 is configured to (i) manage storage of data by the plurality of storage devices of the distributed computer system 308, as well as (ii) data access requests for that data. The supervisory computer 300 can be implemented as a physical electronic device or as a SM.

Managing storage of data may include inter alia (i) acknowledging receipt of data by the distributed computer system 308, (ii) generating redundancy-data for reducing risk of data corruption or loss (e.g., by employing one or more redundancy algorithms), (iii) instructing storage devices to store redundancy-data, (iv) tracking confirmation notifications from storage devices regarding storage of the redundancy-data, and (v) determining which response, if any, is to be provided to the client regarding the storage of the data (e.g., by employing one or more additional algorithms).

Managing data access requests may include inter alia determining whether enough storage device(s) storing redundancy-data are available for retrieving the data of the client. If so, in some embodiments, the supervisory computer 300 may be configured to access the available redundancy-data for retrieving the data. If not, the supervisory computer 300 may be configured to non-ambiguously determine whether or not successful storage of the data has been confirmed to the client during storage thereof. It is contemplated that the supervisory computer 300 may be configured to non-ambiguously determine whether or not successful storage of the data has been confirmed in order to determine which response, if any, is to be provided to the client regarding the data.

Developers of the present technology have devised methods and distributed computer systems for processing data that allow sustaining, in a sense, a "trust" of the client in the distributed computer system 308. For example, if the client does not receive a notification of successful storage of its data by the distributed computer system 308, the client is not per se "expecting" that data to be retrieved and provided thereto in response to a data access request at a future moment in time. As a result, if ever that data is not retrievable at the future moment in time, the client does not loose "trust" in the ability of the distributed computer system 308 to securely store data since the distributed computer system 308 has not provided the notification of successful storage.

If, however, the client does receive the notification of successful storage of its data, the client is per se "expecting" that data to be retrieved and provided thereto in response to a data access request. As a result, if the client does receive the notification of successful storage of its data, but the distributed computer system 308 is not capable of retrieving this data at the future moment in time, the client, in a sense, looses "trust" in the ability of the distributed computer system 308 to securely store data.

Hence, it can be said that "trust" of the client in the distributed computer system 308 is not directed to whether the data is retrievable at the future moment in time, but rather whether the data is retrievable when a notification of successful storage thereof has been provided to the client.

Hence, in some embodiments of the present technology, there are provided methods and distributed computer systems that are configured to issue notifications of successful storage of data to clients under a condition that ensures that the data is stored in such a way that it is retrievable even if a given maximum number of storage devices of the distributed computer system 308 become unavailable at a future moment in time. Put another way, the developers of the present technology have devised methods and distributed computer systems where data is considered to be "successfully stored" when that data is guaranteed to be recoverable at a future moment in time even if a maximum number of storage devices are unavailable at that future moment in time.

In some embodiments, as it will become apparent from the description herein below, methods and distributed computer systems disclosed herein may also help during data access requests to non-ambiguously determine whether the distributed computer system 308 has confirmed successful storage of data to the client.

For example, during data access requests, if data is not retrievable by the distributed computer system 308, the distributed computer system 308 may need to determine which response, if any, is to be provided to the client of that data. Responses that are providable to the client may depend on whether or not the distributed computer system 308 has confirmed successful storage of the data.

In one case, if during storage of the data, the distributed computer system 308 has confirmed successful storage thereof, and the data is retrievable during a data access request, the distributed computer system 308 may be configured to retrieve and provide the data to the client. In a second case, if the during storage of the data, the distributed computer system 308 has not confirmed successful storage thereof, and the data is retrievable during the data access request, the distributed computer system 308 may be configured to retrieve and provide the data to the client. In a third case, if during storage of the data, the distributed computer system 308 has confirmed successful storage thereof, and the data is not retrievable during a data access request, the distributed computer system 308 may be configured to generate a "data error" type of response. In a fourth case, if during storage of the data, the distributed computer system 308 has not confirmed successful storage thereof, and the data is not retrievable during a data access request, the distributed computer system 308 may be configured to generate a "no data" type of response since the client of that data is not per se "expecting" the data to be retrieved and, hence, is not per se "expecting" that the data is successfully stored by the distributed computer system 308.

How the distributed computer system 308 is configured to manage data storage and how the distributed computer system 308 is configured to manage data access requests will now be described in turn.

Figure 4:
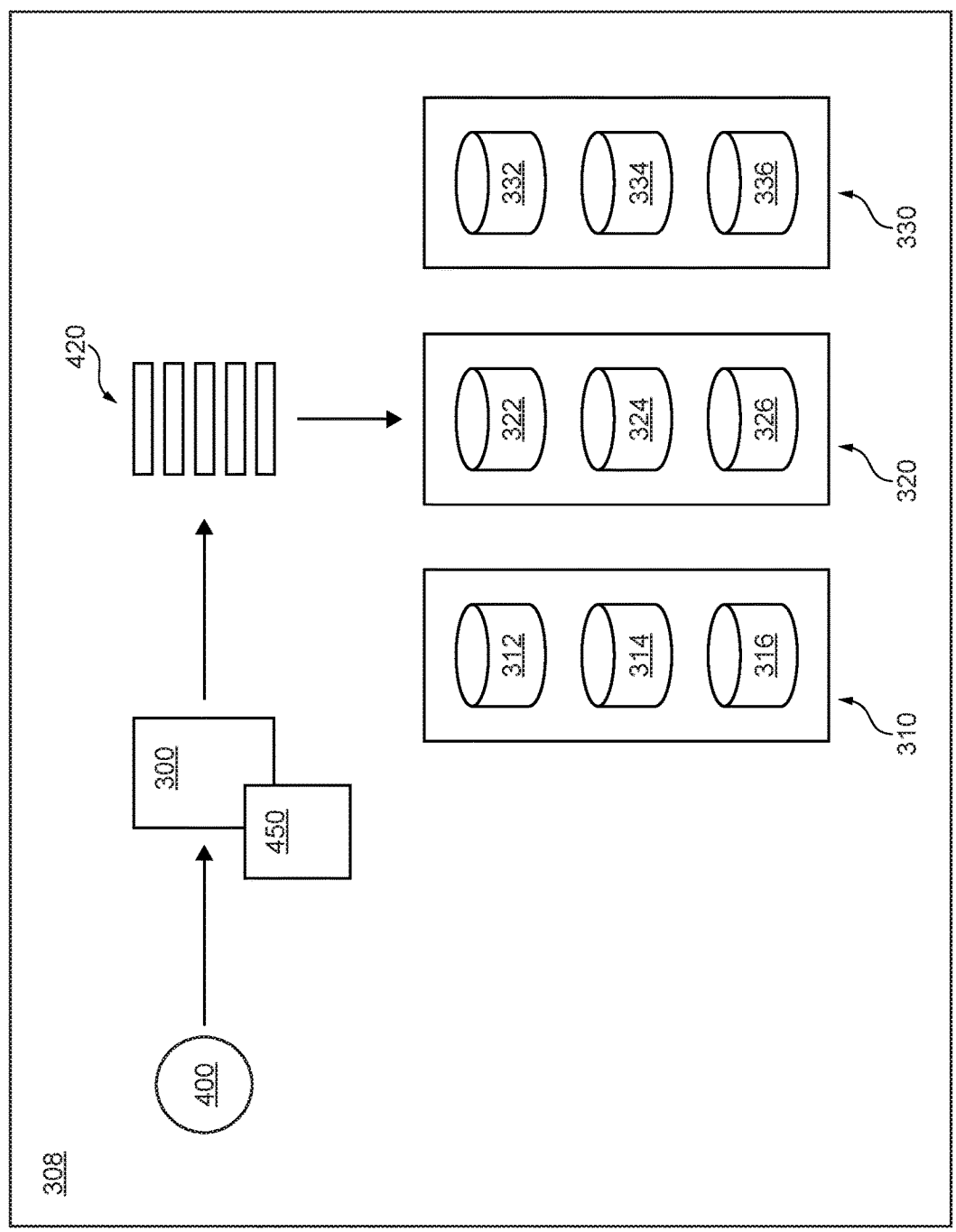
FIG. 4 depicts a supervisory computer of the distributed computer system of FIG. 3 employing a redundancy algorithm, in accordance with non-limiting embodiments of the present technology.

With reference to FIG. 4, let it be assumed that the distributed computer system 308 receives data 400 to be stored. How the data 400 is implemented is not particularly limiting and may depend on inter alia different implementations of the present technology.

The distributed computer system 308 may implement a redundancy algorithm 450. For example, the supervisory computer 300 may be configured to employ the redundancy algorithm 450 during data storage and/or data access. In some cases, the supervisory computer 300 may receive an indication of the redundancy algorithm 450 from an operator of the distributed computer system 308. In other cases, the supervisory computer 300 may receive an indication of the redundancy algorithm 450 from the client of the data 400.

Broadly speaking, the redundancy algorithm 450 is configured to generate "redundancy data pieces" based on the data 400 and which are to be stored across different storage devices to promote recoverability of the data 400 through redundancy thereof in situations where one or more storage devices become unavailable or otherwise inaccessible.

It should be noted that the redundancy algorithm 450 may be (i) of a replication-type or (ii) of an erasure-code-type. Put another way, data redundancy provided by the redundancy algorithm 450 may be achieved by (i) a method of data replication or (ii) by a method of erasure coding. Size of redundancy data pieces that may need to be stored and maintained by the distributed computer system 308, as well as their number, may depend on inter alia the specific method employed by the redundancy algorithm 450.

In some embodiments, where the redundancy algorithm 450 is of a replication-type, the redundancy algorithm 450 is configured to employ a given method of data replication. Broadly speaking, methods of data replication are used to generate one or more replicas of the data 400 that are to be stored across different storage devices. In a first non-limiting example of a method of data replication that can be used by the redundancy algorithm 450, the redundancy algorithm 450 may be configured to generate two replicas (e.g., mirror-2 replication method) of the data 400 for storage on respective different storage devices. In a second non-limiting example of a method of data replication that can be used by the redundancy algorithm 450, the redundancy algorithm 450 may be configured to generate three replicas (e.g., mirror-3 replication method) of the data 400 for storage on respective different storage devices. Irrespective of which specific method of data replication is used by the redundancy algorithm 450, if some of the storage devices fail and become unavailable during data access requests, only one of the replicas of the data 400 needs to be accessible in order to recover the data 400—that is, in such a case, only one storage device storing a replica (e.g., redundancy-data) needs to be available for recovering the data 400.

In other embodiments, where the redundancy algorithm 450 is of an erasure-code-type, the redundancy algorithm 450 is configured to employ a given method of erasure coding. Broadly speaking, a method of erasure coding may be used to split the data 400 into fragments, split each fragment into a number "M" of data pieces, and generate a number "N" of parity data pieces for achieving redundancy of the data 400. The data pieces are then to be stored on respective different storage devices. Hence, different methods of erasure coding are typically labelled as "M+N" erasure coding, with various values of "M" and "N". In some examples, the redundancy algorithm 450 may be configured to employ at least one of, but not limited to: "1+2" erasure coding, "3+2" erasure coding, "5+2" erasure coding, "7+2" erasure coding, "17+3" erasure coding, and the like. Irrespective of which specific method of erasure coding is used by the redundancy algorithm 450, the data 400 is recoverable if any "N" or less storage devices become unavailable.

In summary, it can be said that the supervisory computer 300 may be configured to employ the redundancy algorithm 450 in order to generate redundancy-data 420 based on the data 400. For illustration purposes only, let it be assumed that the redundancy algorithm 450 is of a data-replication-type and is configured to perform a given data replication method, and as such, a mirror-5 replication method, where the redundancy-data 420 includes five redundancy-data pieces (five replicas) to be stored on respective different storage devices. It should be noted that in this case, the redundancy algorithm 450 is indicative of that at least one storage device (amongst the five storage devices that should store respective replicas) need to store a respective redundancy-data piece (respective replica) for the data 400 to be recoverable.

It is contemplated that one or more redundancy algorithms may be implemented by the distributed computer system 308, similarly to how the redundancy algorithm 450 is implemented thereby, without departing from the scope of the present technology. For example, a first redundancy algorithm may be employed by the supervisory computer 300 for first data. In another example, a second redundancy algorithm may be employed by the supervisory computer 300 for second data. Which redundancy algorithm is to be used for which data may be determined by the operator of the distributed computer system 308 and/or clients of the data.

It is contemplated that, during a data storage moment in time (during which the data 400 is being stored by the distributed computer system 308), the supervisory computer 300 is configured to instruct a set of storage devices to store the redundancy-data 420. In this case, the supervisory computer 300 may be configured to instruct a set of five storage devices to store respective redundancy-data pieces (in this case, respective replicas of the data 400) of the redundancy-data 420.

Also, as previously alluded to, the supervisory computer 300 may be configured to track storage confirmation notifications from storage devices. Storage devices are configured to notify the supervisory computer 300 (e.g., by means of confirmation notifications) once they store the data as instructed by the supervisory computer 300. In this case, once the supervisory computer 300 instructs the set of five storage devices to store the respective redundancy-data pieces of the redundancy data 420, these storage devices are configured to notify the supervisory computer 300 once they store their respective redundancy-data pieces.

Also, as previously alluded to, the supervisory computer 300 may be configured to perform one or more additional algorithms for determining which response, if any, is to be provided to the client regarding storage status of the data 400. For example, the supervisory computer 300 may be configured to generate a response, or not to generate a response, depending on inter alia a number of confirmation notifications that the supervisory computer 300 received from storage devices that were instructed to store the redundancy-data 400 as explained above.

Figure 5:
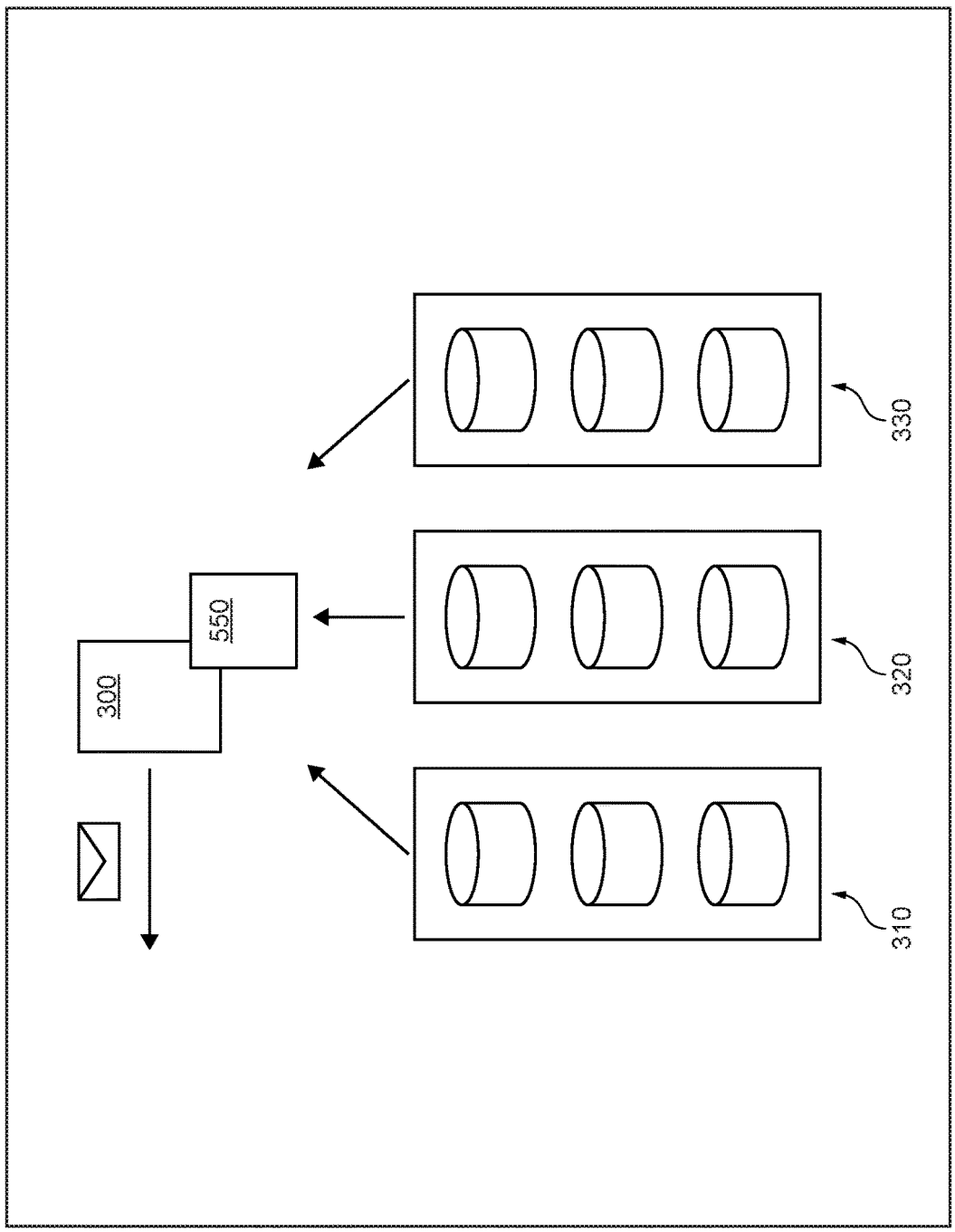
FIG. 5 depicts the supervisory computer employing a failure-model algorithm, in accordance with non-limiting embodiments of the present technology.

In some embodiments of the present technology, the supervisory computer 300 may be configured to employ a failure-model algorithm 550 as depicted in FIG. 5 for determining during data storage which response, if any, is to be provided to the client regarding storage status of the data 400. Put another way, the supervisory computer 300 may employ the failure-model algorithm 550 during data storage for determining whether or not to confirm successful storage of the data 400 to the client.

It is contemplated that the supervisory computer 300 may receive an indication of the failure-model algorithm 550 from the operator of the distributed computer system 308. As it will become apparent from the description herein, in some embodiments of the present technology, the failure-model algorithm 550 may be conceived by the operator of the distributed computer system 308 based on inter alia failure scenarios of the distributed computer system 308 under which the operator would like the data 400 to be recoverable and, hence, under which the distributed computer system 308 may recover the data 400 for the client.

The failure-model algorithm 550 is indicative of a maximum number of storage devices that can potentially fail at a future moment in time, while still having the distributed computer system 308 guaranteeing that the data 400 is recoverable. The supervisory computer 300 may be configured to apply the failure-model algorithm 550 onto the confirmation notifications received from storage devices to determine whether or not the data 400 is recoverable at the future moment in time if the maximum number of storages devices are unavailable at the future moment in time. It is also contemplated that the failure-model algorithm 550 may be configured to verify whether the data 400 is recoverable if different combinations of the maximum number of storage devices are unavailable at the future moment in time.

How the supervisory computer 300 may be configured to employ the failure-model algorithm 550 during data storage will now be described in greater detail.

Figure 6:
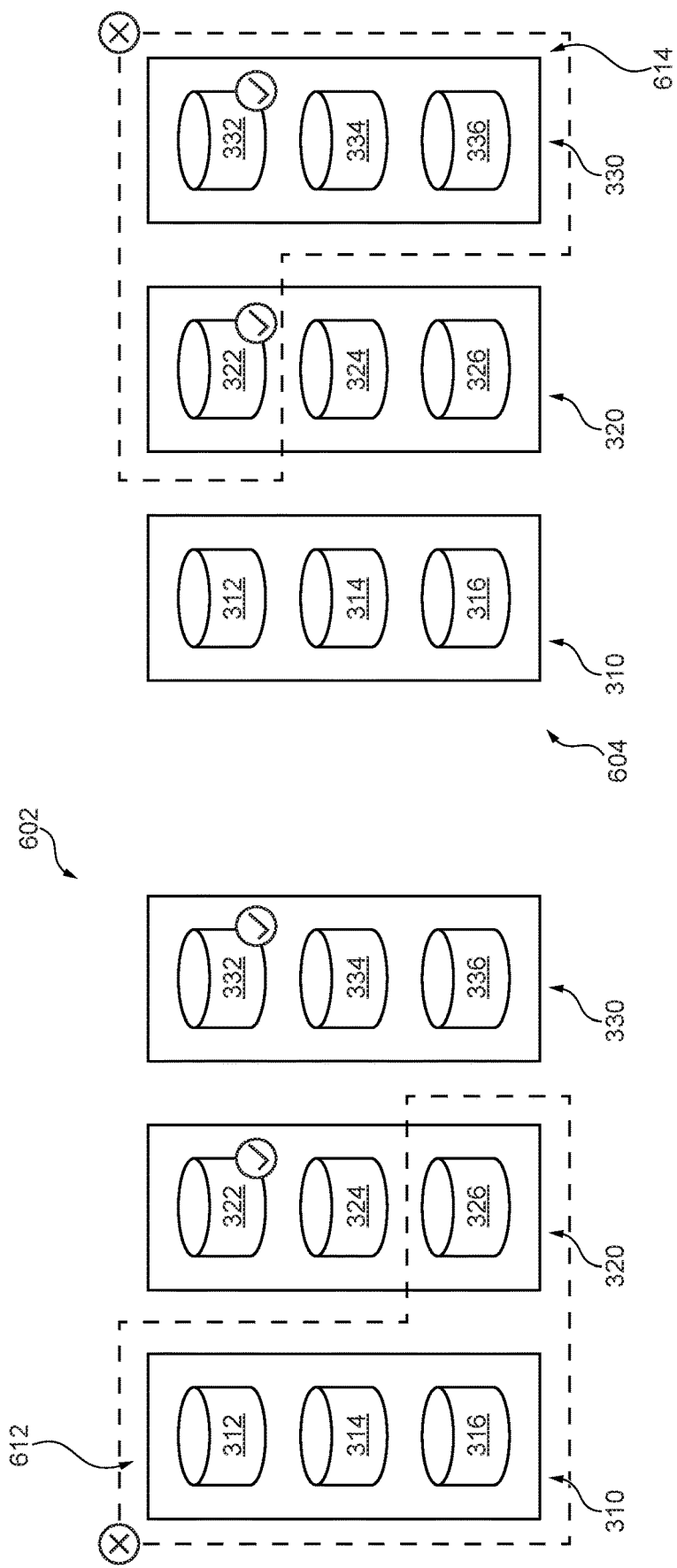
FIG. 6 depicts a first failure scenario and a second failure scenario simulated by the failure-model algorithm of FIG. 5 during a data storage moment in time, in accordance with non-limiting embodiments of the present technology.

Let it be assumed that, at a given moment in time after the supervisory computer 300 instructed the set of storage devices to store the redundancy-data 420, the supervisory computer 300 receives two confirmation notifications. For example, as depicted in FIG. 6, let it be assumed that the supervisory computer 300 receives a confirmation notification from the fourth storage device 322 and from the seventh storage device 332. This means that, at the given moment in time, the fourth storage device 322 and the seventh storage device 332 stored respective redundancy-data pieces (in this case, respective replicas of the data 400).

It should be recalled that based on the redundancy algorithm 450 that is used for generating the redundancy data 420 based on the data 400, the data 400 is recoverable at a future moment in time if at least one redundancy-data piece of the redundancy-data 420 is available at the future moment in time.

At a first glance, since at least one storage device confirmed storage of a respective redundancy-data piece, the data 400 may be recoverable at the future moment in time.

However, instead of confirming to the client that the data 400 has been successfully stored, the supervisory computer 300 is configured to apply the failure-model algorithm 550 in order to determine whether the data 400 is recoverable at the future moment in time if at the future moment in time the maximum number of storage devices are unavailable.

Let it be assumed that this maximum number of storage devices is four. This means that the failure-model algorithm 550 may be used to determine whether the data 400 is recoverable at the future moment in time if at the future moment in time a maximum of four storage devices are unavailable.

As such, the failure-model algorithm 550 may determine whether the data 400 is recoverable if different combinations of four storage devices amongst the plurality of storage device become unavailable at the future moment in time. Put another way, the failure-model algorithm 550 may be configured to, in a sense, "simulate" a plurality of failure scenarios during which different combinations of four storage devices amongst the plurality of storage devices become unavailable.

With reference to FIG. 6, there is depicted a representation 602 of a first failure scenario simulated by the failure-model algorithm 550 and a representation 604 of a second failure scenario simulated by the failure-model algorithm 550.

During the first failure scenario, the failure-model algorithm 550 may be configured to determine whether or not the data 400 is recoverable if a first failure combination 612 of storage devices becomes unavailable. The first failure combination 612 of storage devices comprises four storage devices (the maximum number of storage devices, as explained above), namely the first storage device 312, the second storage device 314, the third storage device 316 and the sixth storage device 326. In this first failure scenario, the supervisory computer 300 may determine that the data 400 is recoverable since at least one storage device storing a respective redundancy-data piece (in this case, a respective replica of the data 400) is available.

During the second failure scenario, the failure-model algorithm 550 may be configured to determine whether or not the data 400 is recoverable if a second failure combination 614 of storage devices becomes unavailable. The second failure combination 614 of storage devices also comprises four storage devices (the maximum number of storage devices, as explained above), namely the fourth storage device 322, the seventh storage device 332, the eighth storage device 334 and the ninth storage device 336. In this second failure scenario, the supervisory computer 300 may determine that the data 400 is not recoverable since none of the storage devices storing respective redundancy-data pieces is available.

As a result, at the given moment in time when confirmation notifications are received by the supervisory computer 300 from the fourth storage device 322 and from the seventh storage device 332, the supervisory computer 300 determines not to generate a confirmation of successful storage to the client of the data 400. It should be noted that although having two storage devices confirming storage of respective redundancy-data pieces in a case where at least one storage device needs to store a respective redundancy-data piece for recovering the data 400, the supervisory computer 300 does not confirm successful storage of the data 400 to the client since recoverability of the data 400 is not guaranteed at the future moment in time if the maximum number of storage device (e.g., four storage devices) become unavailable at the future moment in time.

Thus it can be said that the supervisory computer 300 is configured to generate and provide a confirmation of successful storage of the data 400 to the client only if the data 400 is considered as successfully stored, and where the data 400 is considered as successfully stored if the data 400 is guaranteed to be recoverable at the future moment in time even if the maximum number of storage devices become unavailable at the future moment in time.

It is contemplated that during data storage of the data 400, the supervisory computer 300 may be configured to iteratively apply the failure-model algorithm 550 onto confirmation notifications received from storage devices. In other words, this means that although the supervisory computer 300 determines not to issue a notification of successful storage of the data 400 after applying the failure-model algorithm 550 onto the two confirmation notifications received at that moment in time as explained above, when an additional confirmation notification is received by the supervisory computer 300, the supervisory computer 300 may apply the failure-model algorithm 550 onto three confirmation notifications for determining whether to issue a notification of successful storage of the data 400. Thus, it can be said that in some embodiments of the present technology, the supervisory computer 300 may be configured to iteratively apply the failure-model algorithm 550 onto confirmation notifications received from storage devices each time a new confirmation notification is received by the supervisory computer 300.

In some cases, failure combinations of the maximum number of storage devices that the failure-model algorithm 550 simulates may include all possible combinations of the maximum number of storage devices of in the distributed computer system 308. In other cases, failure combinations of the maximum number of storage devices that are simulated may include only those combinations of the maximum number of storage devices that are in accordance with an operator-set constraint.

For example, the operator-set constraint may be that failure combinations of the maximum number of storage devices that are simulated must fully encompass one storage group. In the case of the first failure combination 612 of storage devices, the first failure combination 612 fully encompasses the first storage group 310. In the case of the second failure combination 614 of storage devices, the second failure combination 614 fully encompasses the third storage group 330. As such, it is contemplated that the operator of the distributed computer system 308 may issue operator-set constraints in order to limit a number of failure combinations of the maximum number of storage devices amongst all possible combinations of the maximum number of storage devices that the failure-model algorithm 550 may be configured to simulate when applied onto confirmation notifications received by the supervisory computer 300.

Developers of the present technology have realized that employing the failure-model algorithm 550 for determining whether or not to confirm successful storage of the data 400 during data storage may be beneficial. As it will be described below, employing the failure-model algorithm 550 during data storage for determining whether or not to confirm successful storage of the data 400 may allow to non-ambiguously determine during data access requests whether or not successful storage of the data 400 has been confirmed.

In this case, based on the redundancy algorithm 450, only one replica amongst five replicas is needed to restore the data 400. However, it is contemplated that by using the failure-model algorithm 550, in order to issue a confirmation of successful storage of the data 400 may need between one and five replicas, inclusively, to be stored. For example, although only one replica amongst five replicas is needed to retrieve the data 400, in some cases, the confirmation of successful storage of the data 400 may be issued after five replicas are stored by respective storage devices.

It should be noted that it is less important whether or not in response to data access requests data is determined to be unavailable, corrupted or lost. What is more important, however, is to determine which response, if any, is to be provided when the data is unavailable, corrupted or lost (not recoverable/retrievable). Put another way, if the data has been confirmed as successfully stored, the supervisory computer 300 may be configured to either (i) provide the data (if recoverable), or an "OK" type of response, or (ii) provide a response indicative of that the data is unavailable, corrupted or lost, such as a "data error" type of response. However, if the data has not been confirmed as successfully stored, the supervisory computer 300 may be configured to either (i) provide the data (if recoverable) or an "OK" type of response, or (ii) provide a response indicative of that the distributed computer system 308 does not have the data, such as a "no data" type of response.

For the sake of illustration, let it be assumed that the supervisory computer 300 does confirm successful storage of the data 400 (since the data 400 is potentially recoverable). In such a case, if the second failure scenario is occurring during a data access request, the distributed computer system 108 may need to provide a "data error" type of response since it has been confirmed that the data 400 is successfully stored, as opposed to providing a "no data" type of response if it has not been confirmed that the data 400 is successfully stored.

As mentioned above, the supervisory computer 300 may also be configured to manage data access requests. It is contemplated that in some embodiments of the present technology, the failure-model algorithm 550 may also be employed by the supervisory computer 300, not only during data storage, but also during data access requests. As it will be explained below, the supervisory computer 300 may employ the failure-model algorithm 550 during data access requests to non-ambiguously determine whether a confirmation of successful storage has been confirmed to the client during data storage.

Let it be assumed that at a given data access moment in time, the supervisory computer 300 receives an indication of an access request for other data from an other client. The other data from the other client may have been managed by the supervisory computer 300 during a data storage moment in time similarly to how the data 400 of the client has been managed during its data storage moment in time. For example, the redundancy algorithm 450 may have employed a mirror-5 replication method and the supervisory computer 300 may have instructed storage devices to store respective replicas of the other data.

As such, during the given data access moment in time, when the supervisory computer 300 receives the indication of the access request for the other data, the supervisory computer 300 may be configured to apply the failure-model algorithm 550 onto confirmation notifications that have been received from storage devices, which storage devices have been instructed to store respective replicas of the other data.

Figure 7:
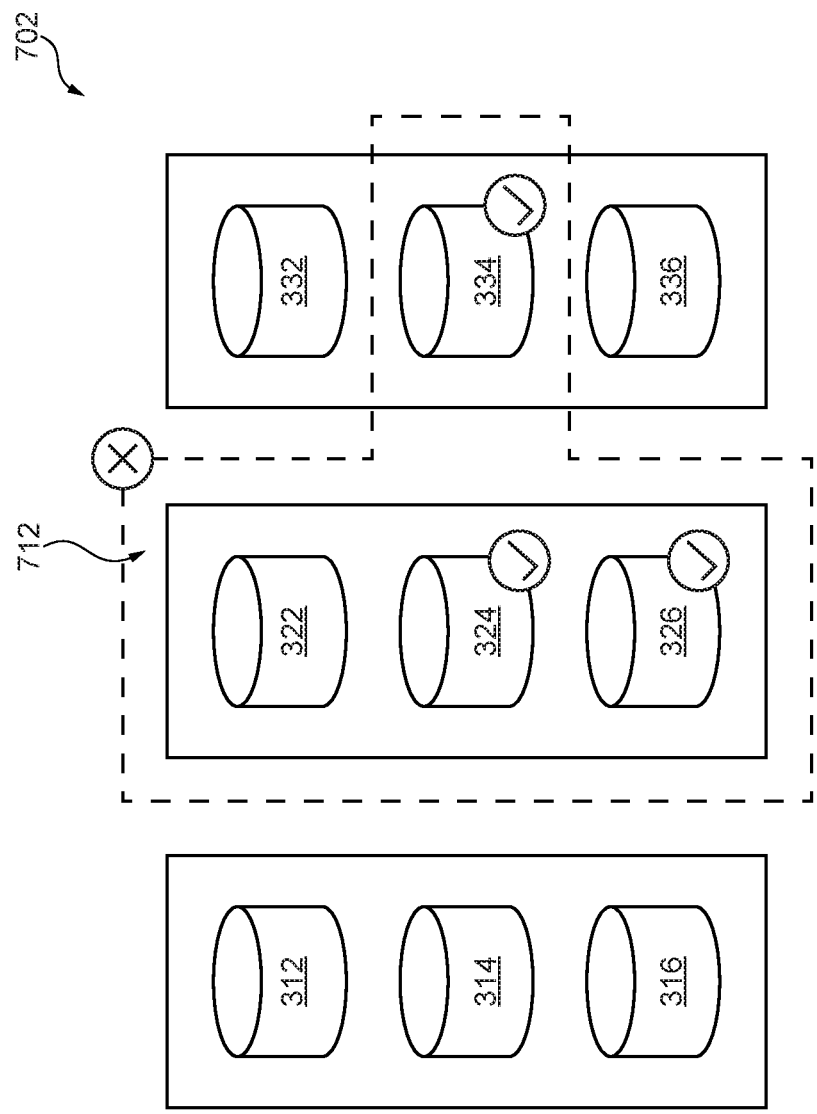
FIG. 7 depicts a third failure scenario simulated by the failure-model algorithm of FIG. 5 during a data access moment in time, in accordance with non-limiting embodiments of the present technology.

With reference to FIG. 7, let it be assumed that the supervisory computer 300 received confirmation notifications from the fifth storage device 324, the sixth storage device 326 and the eighth storage device 328 which are indicative of that the fifth storage device 324, the sixth storage device 326 and the eighth storage device 328 have stored respective replicas of the other data.

The supervisory computer 300 may employ the failure-model algorithm 550 onto these confirmation notifications in order to non-ambiguously determine whether a confirmation of successful storage of the other data has been provided to the other client at the storage moment in time of the other data. It is contemplated that non-ambiguously knowing whether a confirmation of successful storage of the other data has been provided to the other client at the storage moment in time of the other data may be beneficial for determining which response, if any, is to be provided to the other client in response to the data access request.

As such, the failure-model algorithm 550 may be configured to, in a sense, "simulate" a plurality of failure scenarios similarly to what has been described above, but now during the given data access moment in time.

In FIG. 7, there is depicted a representation 702 of a third failure scenario simulated by the failure-model algorithm 550 during the given data access moment in time.

During the third failure scenario, the failure-model algorithm 550 may be configured to determine whether or not the other data is recoverable if a third failure combination 712 of storage devices becomes unavailable. The third failure combination 712 of storage devices comprises four storage devices (the maximum number of storage devices, as explained above), namely the fourth storage device 322, the fifth storage device 324, the sixth storage device 326 and the eighth storage device 334. In this third failure scenario, the supervisory computer 300 may determine that the other data is not recoverable since none of the storage devices storing respective replicas of the other data is available. As such, the supervisory computer 300 non-ambiguously determines that a confirmation of successful storage of the other data has not been provided to the other client during the data storage moment in time of the other data.

Based on this non-ambiguous determination of that a confirmation of successful storage of the other data has not been provided to the other client, the supervisory computer 300 may be configured to determine which response, if any, is to be provided to the other client. For example, let it be assumed that the other data is actually not retrievable at the data access request moment in time. As such, since the supervisory computer 300 non-ambiguously determined that the other data has not been confirmed as successfully stored, the supervisory computer 300 may be configured to provide a "no data" type of response to the data access request, instead of providing a "data error" type of response.

However, assuming that the supervisory computer 300 non-ambiguously determines that the confirmation of successful storage of the other data has been provided to the other client, in such a case, if the other data is not retrievable at the data access request moment in time, the supervisory computer 300 may be configured to provide a "data error" type of response, instead of providing a "no data" type of response.

Figure 8:
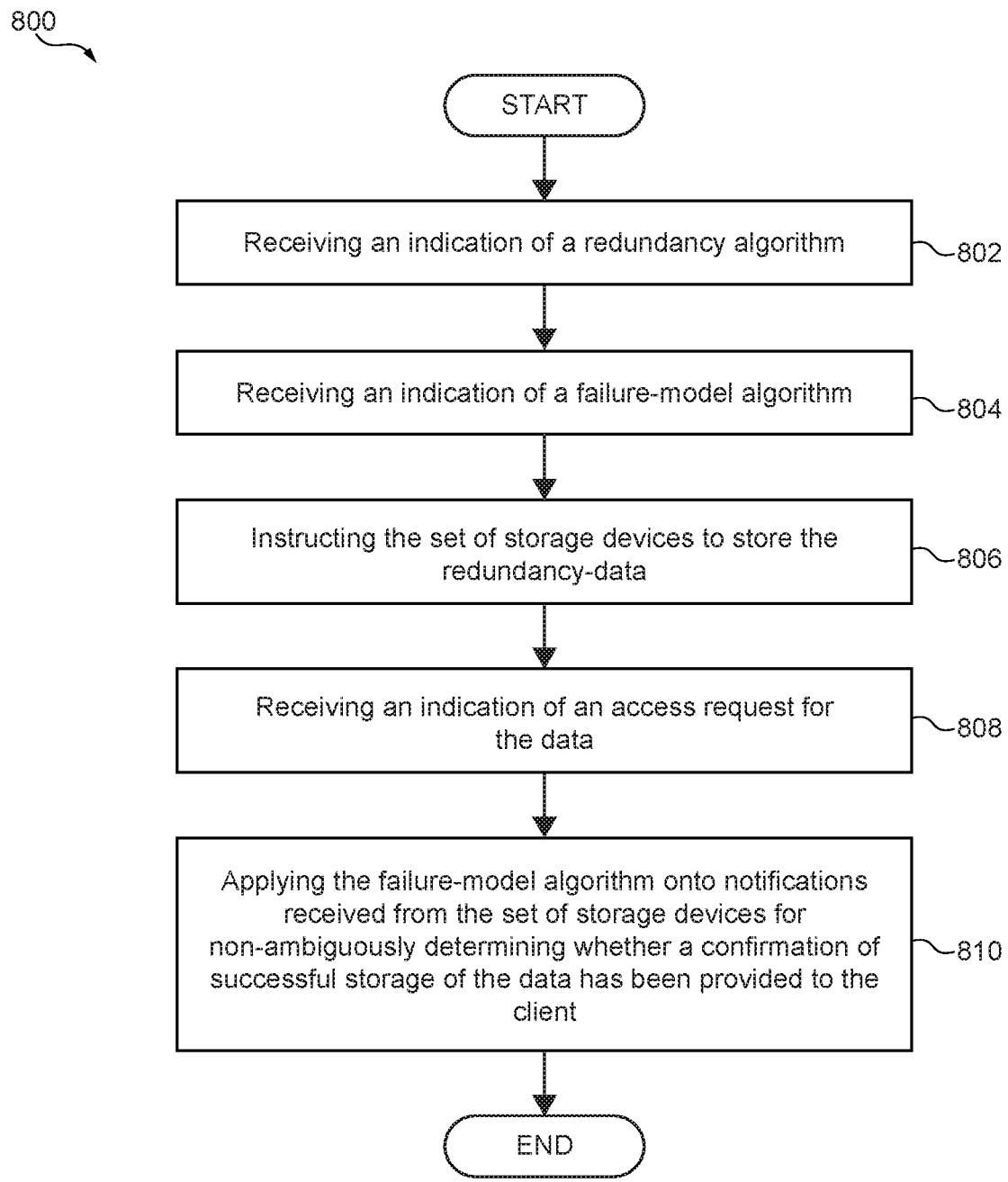
FIG. 8 depicts a block diagram of a method, the method being executable by the supervisory computer and being implemented in accordance with non-limiting embodiments of the present technology.

In some embodiments of the present technology, there is provided a computer-implemented method 800, a flow-chart of which is depicted in FIG. 8, of implemented a distributed computer system for processing data. For example, the method 800 may be directed to implementing the distributed computer system 308. It is contemplated that at least some steps of the method 800 may be performed by the supervisory computer 300. In other embodiments, at least some other steps may be performed by other potential computer systems of the distributed computer system 308, without departing from the scope of the present technology. The method 800 will now be described in greater detail.

STEP 802: Receiving an Indication of a Redundancy Algorithm

The method 800 begins at step 802 with the supervisory computer 300 of the distributed computer system 308 receiving the indication of the redundancy algorithm 450. The redundancy algorithm 450 may be used by the distributed computer system 308 for generating redundancy-data based on data, such as, for example, for generating the redundancy-data 420 based on the data 400. The redundancy-data 420 is to be stored by a set of storage devices of the plurality of storage devices of the distributed computer system 308. The redundancy algorithm is indicative of a number of storage devices that need to store the redundancy-data 420 for the data 400 to be recoverable.

In some embodiments, the redundancy algorithm 450 may be of a replication-type. For example, the redundancy algorithm 450 may employ a mirror-5 replication algorithm to generate the redundancy-data 420 including 5 replicas of the data 400. In this case, the redundancy algorithm 450 may be indicative of that only one storage device needs to store a respective redundancy-data piece of the redundancy-data 420 for the data 400 to be recoverable. Put another way, since the redundancy algorithm 450 is of a replication-type that generates the redundancy-data 420 in a form of replicas of the data 400 (in this example), the redundancy algorithm 450 is indicative of that only one storage device needs to store a respective replica for the data 400 to be recoverable. However, it is contemplated that in other embodiments, the redundancy algorithm 450 may be of an erasure-code-type, as explained above.

STEP 804: Receiving an Indication of a Failure-Model Algorithm

The method 800 continues to step 804 with the supervisory computer 300 receiving the indication of the failure-model algorithm 550. The failure-model algorithm is to be used for confirming during the data storage moment in time whether or not the data 400 is successfully stored. It should be noted that successfully stored data is guaranteed to be recoverable at a future moment in time if a maximum number of storage devices are unavailable at the future moment in time, as explained above.

In some embodiments of the present technology, data may also be considered as successfully stored when it is guaranteed to be recoverable at a future moment in time if at least one combination of a maximum number of storage devices is unavailable at the future moment in time.

The failure-model algorithm 400 may also be used for non-ambiguously determining during the data access request moment in time whether or not successful storage of the data 400 has been confirmed during the data storage moment in time of the data 400.

STEP 806: Instructing the Set of Storage Devices to Store the Redundancy-Data The method 800 continues to step 806 with the supervisory computer 300 instructing during the data storage moment in time of the set of storage devices (amongst the plurality of storage devices) to store the redundancy-data 420.

For example, in a case where the redundancy algorithm 450 employs a mirror-5 replication method, the set of storage devices may comprise 5 storage devices that are instructed to store respective ones of the five replicas of the data 400. These storage devices are configured to notify (issue a confirmation notification) the supervisory computer 300 once the redundancy-data 420 is stored thereby. For example, when a first given one of the set of storage devices stores the respective replica of the data 400, the first given one of the set of storage devices is configured to issue a confirmation notification regarding the stored replica of the data 400 thereby.

In some embodiments, during the data storage moment in time, the supervisory computer 300 may be configured to apply the failure-model algorithm 550 onto notifications received from the set of storage devices for determining whether to provide to the client the confirmation of successful storage of the data 400.

In some embodiments, the supervisory computer 300 may be configured to apply the failure-model algorithm 550 during the data storage moment in time in an iterative manner—that is, the supervisory computer 300 may iterative apply the failure-model algorithm 550 during the data storage moment in time onto the notifications received from the storage devices each time a new notification is received.

For example, let it be assumed that at a given moment in time, two out of the set of five storage devices have issued confirmation notifications. As such, the supervisory computer 300 may apply the failure-model algorithm 550 onto the two confirmation notifications. Let it be assumed that in response to applying the failure-model algorithm 550, the supervisory computer 300 determines not to issue a confirmation of successful storage of the data 400 to the client. In such a case, the supervisory computer 300 may be configured to apply, again, the failure-model algorithm 550 onto three confirmation notifications once a third confirmation notification is received from a third one of the set of five storage devices.

In some embodiments, in order to iteratively apply the failure-model algorithm 550, the supervisory computer 300 may be configured to wait for other storages devices form the set of storage devices to issue new notifications. For example, in the above example, the supervisory computer 300 may be configured to wait until a third confirmation notification is received for the third one of the set of five storage devices. The supervisory computer 300 may also be configured to wait until a fourth confirmation notification is received for a fourth one of the set of five storage devices. The supervisory computer 300 may also be configured to wait until a fifth confirmation notification is received for a fifth one of the set of five storage devices.

It is also contemplated that in order to iteratively apply the failure-model algorithm 550, the supervisory computer 300 may be configured to track confirmation notifications from the other storage devices form the set of storage devices to issue new notifications. For example, in the above example, the supervisory computer 300 may be configured to track whether the third one, the fourth one, and the fifth one of the set of five storage devices issue respective confirmation notifications.

In some embodiments, the supervisory computer 300 may provide during the data storage moment in time the confirmation of successful storage of the data 400 when a given number of storage devices notify that redundancy-data 420 is stored thereby.

In some cases, this given number of storage devices is above the number of storage devices that need to store the redundancy-data 420 for the data 400 to be recoverable. For example, in the case where the redundancy algorithm 450 is of a replication-type, this means that the supervisory computer 300 may provide during the data storage moment in time the confirmation of successful storage of the data 400 when more than one storage devices issued respective confirmation notifications.

In other cases, this given number of storage devices is between (i) the number of storage devices that need to store the redundancy-data for the data to be recoverable, and (ii) a total number of storages devices in the plurality of storage devices, inclusively. For example, in the case where the redundancy algorithm 450 is of a replication-type, this means that the supervisory computer 300 may provide during the data storage moment in time the confirmation of successful storage of the data 400 when between (i) one storage device and (ii) a number of storage devices equal to the total number of storage devices in the plurality of storage devices have issued respective confirmation notifications.

In some embodiments, data may be considered as successfully stored if it is guaranteed to be recoverable at a future moment in time if different combinations of the maximum number of storage devices are unavailable at the future moment in time. It is contemplated that the different combinations may include at least some of all possible combinations amongst the plurality of storage devices.

STEP 808: Receiving an Indication of an Access Request for the Data

The method 800 continues to step 808 with the supervisory computer 300 receiving an indication of access request for the data 400. For example, the client of the data 400 may be configured to issue a data access request for the data 400.

STEP 810: Applying the Failure-Model Algorithm Onto Notifications Received From the Set of Storage Devices for Non-Ambiguously Determining Whether a Confirmation of Successful Storage of the Data has been Provided to the Client The method 800 continues to step 810 with the supervisory computer 300 configured to, during the data access request moment in time, applying the failure-model algorithm 550 onto notifications received from the set of storage devices. The supervisory computer 300 applies the failure-model algorithm 550 for non-ambiguously determining whether a confirmation successful storage of the data 400 has been provided to the client.

For example, if at the data access request moment in time, the data 400 is not retrievable, the supervisory computer 300 may provide different response to the client depending on whether or not the distributed computer system 308 has confirmed that the data 400 has been successfully stored during the data storage moment in time.

In some embodiments, in response to non-ambiguously determining that the confirmation of successful storage of the data has been provided to the client at the data storage moment in time, the supervisory computer 300 may provide a "data error" type of response to the data access request of the client.

In other embodiments, in response to non-ambiguously determining that the confirmation of successful storage of the data has not been provided to the client at the data storage moment in time, the supervisory computer may provide a "no data" type of response to the data access request of the client.

As it can be appreciated from the above description, data may be confirmed as successfully stored, in some embodiments of the present technology, if it is guaranteed to be recoverable at a future moment in time if (i) at least one combination of storage devices is unavailable at the future moment in time, (ii) a maximum number of storage devices is unavailable at the future moment in time, (iii) at least one combination of the maximum number of storage devices is unavailable at the future moment in time, (iv) a set of combinations of storage devices is unavailable at the future moment in time, and/or (v) a set of combinations of the maximum number of storage devices is unavailable at the future moment in time. It is contemplated that operator-set constraints of the operator of the distributed computer system 308, as explained above, may result in the combination(s), set(s) of combinations, and/or maximum number of storage devices that the failure-model algorithm 550 may take into account for determining whether or not to issue a notification of successfully stored data. Therefore, it can be said that the data may be confirmed to be successfully stored if a pre-determined condition is met. The pre-determined condition can be expressed as any one of a combination of a maximum number of storage devices, a combination of storage devices (expressed in the number of storage devices and/or data centers where they are located and/or combination thereof).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method for implementing a distributed computer system for processing data, the data originating from a client of the distributed computer system, the distributed computer system having a plurality of storage devices and a supervisory computer, the method executable by the supervisory computer, the method comprising:

receiving, by the supervisory computer, an indication of a redundancy algorithm to be used for generating redundancy-data based on the data, the redundancy-data to be stored by a set of storage devices, the redundancy algorithm being indicative of a number of storage devices that need to store the redundancy-data for the data to be recoverable;

receiving, by the supervisory computer, an indication of a failure-model algorithm to be used for confirming successful storage of the data to the client, successfully stored data being guaranteed to be recoverable at a future moment in time if at least one combination of storage devices is unavailable at the future moment in time;

at a data storage moment in time:

instructing, by the supervisory computer, the set of storage devices to store the redundancy-data, a given storage device being configured to notify the supervisory computer once the redundancy-data is stored thereby;

at a data access moment time:

receiving, by the supervisory computer, an indication of an access request for the data; and applying, by the supervisory computer, the failure-model algorithm onto notifications received from the set of storage devices for non-ambiguously determining whether a confirmation of successful storage of the data has been provided to the client at the data storage moment in time.

2. The method of claim 1, wherein the redundancy algorithm is of a replication-type.

3. The method of claim 2, wherein the redundancy-data comprises replicas of the data.

4. The method of claim 1, wherein the redundancy algorithm is of an erasure-code-type.

5. The method of claim 1, wherein the method further comprises:

applying, by the supervisory computer, the failure-model algorithm onto notifications received from the set of storage devices during the data storage moment in time for determining whether to provide to the client the confirmation of successful storage of the data.

6. The method of claim 5, wherein the applying the failure-model algorithm during the data storage moment in time comprises iteratively applying the failure-model algorithm during the data storage moment in time onto the notifications received from the storage devices each time a new notification is received.

7. The method of claim 6, wherein the iteratively applying the failure-model algorithm comprises waiting for other storages devices form the set of storage devices to issue new notifications.

8. The method of claim 6, wherein the iteratively applying the failure-model algorithm comprises tracking new notifications issued by other storage devices from the set of storage devices.

9. The method of claim 5, wherein the supervisory computer determines to provide during the data storage moment in time the confirmation of successful storage of the data when a given number of storage devices notify that redundancy-data is stored thereby.

10. The method of claim 9, wherein the given number of storage devices is above the number of storage devices that need to store the redundancy-data for the data to be recoverable.

11. The method of claim 9, wherein the given number of storage devices is between (i) the number of storage devices that need to store the redundancy-data for the data to be recoverable, and (ii) a total number of storages devices in the plurality of storage devices, inclusively.

12. The method of claim 1, wherein the successfully stored data is guaranteed to be recoverable at a future moment in time if different combinations of storage devices are unavailable at the future moment in time.

13. The method of claim 12, wherein the different combinations comprise at least some of all possible combinations amongst the plurality of storage devices.

14. The method of claim 1, wherein in response to non-ambiguously determining that the confirmation of successful storage of the data has been provided to the client at the data storage moment in time, the method further comprises providing a data error type of response to the data access request of the client.

15. The method of claim 1, wherein in response to non-ambiguously determining that the confirmation of successful storage of the data has not been provided to the client at the data storage moment in time, the method further comprises providing a no data type of response to the data access request of the client.

16. A distributed computer system for processing data, the data originating from a client of the distributed computer system, the distributed computer system having a plurality of storage devices and a supervisory computer, the supervisory computer being configured to:

receive an indication of a redundancy algorithm to be used for generating redundancy-data based on the data, the redundancy-data to be stored by a set of storage devices, the redundancy algorithm being indicative of a number of storage devices that need to store the redundancy-data for the data to be recoverable;

receive an indication of a failure-model algorithm to be used for confirming successful storage of the data to the client, successfully stored data being guaranteed to be recoverable at a future moment in time if at least one combination of storage devices is unavailable at the future moment in time;

at a data storage moment in time:

instruct the set of storage devices to store the redundancy-data, a given storage device being configured to notify the supervisory computer once the redundancy-data is stored thereby;

at a data access moment time:

receive an indication of an access request for the data; and apply the failure-model algorithm onto notifications received from the set of storage devices for non-ambiguously determining whether a confirmation of successful storage of the data has been provided to the client at the data storage moment in time.

17. The distributed computer system of claim 16, wherein the redundancy algorithm is of a replication-type.

18. The distributed computer system of claim 17, wherein the redundancy-data comprises replicas of the data.

19. The distributed computer system of claim 16, wherein the redundancy algorithm is of an erasure-code-type.

20. The distributed computer system of claim 16, wherein the supervisory computer is further configured to:
apply the failure-model algorithm onto notifications received from the set of storage devices during the data storage moment in time for determining whether to provide to the client the confirmation of successful storage of the data.

21. The distributed computer system of claim 20, wherein to apply the failure-model algorithm during the data storage moment in time comprises the supervisory computer configured to iteratively apply the failure-model algorithm during the data storage moment in time onto the notifications received from the storage devices each time a new notification is received.

22. The distributed computer system of claim 21, wherein to iteratively apply the failure-model algorithm comprises the supervisory computer configured to wait for other storages devices form the set of storage devices to issue new notifications.

23. The distributed computer system of claim 21, wherein to iteratively apply the failure-model algorithm comprises the supervisory computer configured to track new notifications issued by other storage devices from the set of storage devices.

24. The distributed computer system of claim 20, wherein the supervisory computer determines to provide during the data storage moment in time the confirmation of successful storage of the data when a given number of storage devices notify that redundancy-data is stored thereby.

25. The distributed computer system of claim 24, wherein the given number of storage devices is above the number of storage devices that need to store the redundancy-data for the data to be recoverable.

26. The distributed computer system of claim 24, wherein the given number of storage devices is between (i) the number of storage devices that need to store the redundancy-data for the data to be recoverable, and (ii) a total number of storages devices in the plurality of storage devices, inclusively.

27. The distributed computer system of claim 16, wherein the successfully stored data is guaranteed to be recoverable at a future moment in time if different combinations of storage devices are unavailable at the future moment in time.

28. The distributed computer system of claim 27, wherein the different combinations comprise at least some of all possible combinations amongst the plurality of storage devices.

29. The distributed computer system of claim 16, wherein in response to non-ambiguously determining that the confirmation of successful storage of the data has been provided to the client at the data storage moment in time, the supervisory computer is further configured to provide a data error type of response to the data access request of the client.

30. The distributed computer system of claim 16, wherein in response to non-ambiguously determining that the confirmation of successful storage of the data has not been provided to the client at the data storage moment in time, the supervisory computer is further configured provide a no data type of response to the data access request of the client.

* * * * *